US010825237B2

(12) United States Patent
Gorur Sheshagiri et al.

(10) Patent No.: US 10,825,237 B2
(45) Date of Patent: Nov. 3, 2020

(54) EXTENDED REALITY VIRTUAL ASSISTANT

(71) Applicant: QUALCOMM Incorporated, San Diego, CA (US)

(72) Inventors: Pushkar Gorur Sheshagiri, Bengaluru (IN); Pawan Kumar Baheti, Bangalore (IN); Ajit Deepak Gupte, Bangalore (IN); Sandeep Kanakapura Lakshmikantha, Ramanagar District (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/376,857

(22) Filed: Apr. 5, 2019

(65) Prior Publication Data

US 2019/0236835 A1    Aug. 1, 2019

Related U.S. Application Data

(63) Continuation of application No. 15/655,762, filed on Jul. 20, 2017, now Pat. No. 10,304,239.

(51) Int. Cl.
*G06T 15/20*    (2011.01)
*G06F 3/01*    (2006.01)
(Continued)

(52) U.S. Cl.
CPC .......... *G06T 15/20* (2013.01); *G02B 27/0093* (2013.01); *G02B 27/017* (2013.01); *G06F 1/163* (2013.01); *G06F 3/011* (2013.01); *G06F 3/012* (2013.01); *G06F 3/017* (2013.01); *G06F 3/0304* (2013.01); *G06F 3/04815* (2013.01); *G06F 3/04842* (2013.01); *G06T 7/70* (2017.01); *G06T 13/40* (2013.01); *G06T 19/006* (2013.01); *G02B 2027/0187* (2013.01); *G06F 3/167* (2013.01); *G06T 3/20* (2013.01); *G06T 7/60* (2013.01); *G06T 2219/024* (2013.01)

(58) Field of Classification Search
CPC ............................. G06T 19/006; G06T 13/40
See application file for complete search history.

(56) References Cited

U.S. PATENT DOCUMENTS

| 6,034,652 | A | 3/2000 | Freiberger et al. |
|---|---|---|---|
| 2003/0046689 | A1 | 3/2003 | Gaos |
| 2004/0189675 | A1 | 9/2004 | Pretlove et al. |
| 2005/0245302 | A1* | 11/2005 | Bathiche ................. A63F 13/00 463/1 |
| 2010/0182220 | A1 | 7/2010 | Bathiche et al. |
| 2010/0306021 | A1 | 12/2010 | O'Connor et al. |

(Continued)

OTHER PUBLICATIONS

International Search Report and Written Opinion—PCT/US2018/038509—ISA/EPO—dated Oct. 16, 2018.

*Primary Examiner* — Jeffery A Brier
(74) *Attorney, Agent, or Firm* — Qualcomm Incorporated

(57) ABSTRACT

Methods, devices, and apparatuses are provided to facilitate a positioning of an item of virtual content in an extended reality environment. For example, a first user may access the extended reality environment through a display of a mobile device, and in some examples, the methods may determine positions and orientations of the first user and a second user within the extended reality environment. The methods may also determine a position for placement of the item of virtual content in the extended reality environment based on the determined positions and orientations of the first user and the second user, and perform operations that insert the item of virtual content into the extended reality environment at the determined placement position.

30 Claims, 12 Drawing Sheets

(51) Int. Cl.

| | |
|---|---|
| *G06F 3/0481* | (2013.01) |
| *G02B 27/01* | (2006.01) |
| *G02B 27/00* | (2006.01) |
| *G06F 1/16* | (2006.01) |
| *G06F 3/03* | (2006.01) |
| *G06F 3/0484* | (2013.01) |
| *G06T 7/70* | (2017.01) |
| *G06T 13/40* | (2011.01) |
| *G06T 19/00* | (2011.01) |
| *G06F 3/16* | (2006.01) |
| *G06T 3/20* | (2006.01) |
| *G06T 7/60* | (2017.01) |

(56) References Cited

U.S. PATENT DOCUMENTS

| | | | |
|---|---|---|---|
| 2010/0306825 A1 | 12/2010 | Spivack | |
| 2011/0096093 A1* | 4/2011 | Oi | G06T 19/006 345/633 |
| 2012/0293506 A1 | 11/2012 | Vertucci et al. | |
| 2014/0204002 A1 | 7/2014 | Bennet et al. | |
| 2014/0368537 A1 | 12/2014 | Salter et al. | |
| 2016/0025981 A1 | 1/2016 | Burns et al. | |
| 2016/0180581 A1* | 6/2016 | Jones | H05K 999/99 345/420 |
| 2016/0253842 A1* | 9/2016 | Shapira | G02B 27/017 345/633 |
| 2018/0300040 A1* | 10/2018 | Mate | G06F 3/012 |
| 2019/0026936 A1 | 1/2019 | Gorur et al. | |

\* cited by examiner

EXTENDED REALITY VIRTUAL ASSISTANT

CROSS-REFERENCE TO RELATED APPLICATIONS

This application is a Continuation of U.S. application Ser. No. 15/655,762, filed Jul. 20, 2017, which is hereby incorporated by reference, in its entirety and for all purposes.

FIELD OF THE DISCLOSURE

This disclosure generally relates to computer-implemented systems and processes that dynamically position virtual content within an extended reality environment.

BACKGROUND

Mobile devices enable users to explore and immerse themselves in extended reality environments, such as augmented reality environments that provide a real-time view of a physical real-world environment that is merged with or augmented by computer generated graphical content. When immersed in the extended reality environment, many users experience a tenuous link to real-world sources of information, the provision of which within the extended reality environment would further enhance the user's ability to interact with and explore the extended reality environment.

SUMMARY

Disclosed computer-implemented extended reality methods can include determining, by one or more processors, a position and an orientation of a first user in an extended reality environment. The methods can also include determining, by the one or more processors, a position and an orientation a second user in the extended reality environment. The methods can further include determining, by the one or more processors, a position for placement of an item of virtual content in the extended reality environment based on the determined positions and orientations of the first user and the second user, and inserting the item of virtual content into the extended reality environment at the determined placement position.

A disclosed apparatus is capable of being used in an extended reality environment. The apparatus can include a non-transitory, machine-readable storage medium storing instructions, and at least one processor configured to execute the instructions to determine a position and an orientation of a first user in an extended reality environment. The at least one processor is also configured to determine a position and an orientation of a second user in the extended reality environment. The at least one processor is configured to execute the instructions to determine a position for placement of an item of virtual content in the extended reality environment based on the determined positions and orientations of the first user and the second user, and to insert the virtual assistant into the extended reality environment at the determined placement position.

A disclosed apparatus has means for determining a position and an orientation of a first user in an extended reality environment. The apparatus also includes means for determining a position and an orientation of a second user in the augmented reality environment. The apparatus includes means for determining a position for placement of an item of virtual content in the extended reality environment, at least partially based on the determined positions and orientations of the first user and the second user. The apparatus also includes means for inserting the item of virtual content into the extended reality environment at the determined placement position.

A disclosed non-transitory computer-readable storage medium is encoded with processor-executable program code that includes program code for determining a position and an orientation of a first user in an extended reality environment, program code for determining a position and an orientation of a second user in the extended reality environment, program code for determining a placement position for placement of an item of virtual content in the extended reality environment at least partially based on the determined positions and orientations of the first user and the second user, and program code for inserting the item of virtual content into the extended reality environment at the determined placement position.

DETAILED DESCRIPTION

Figure 1:
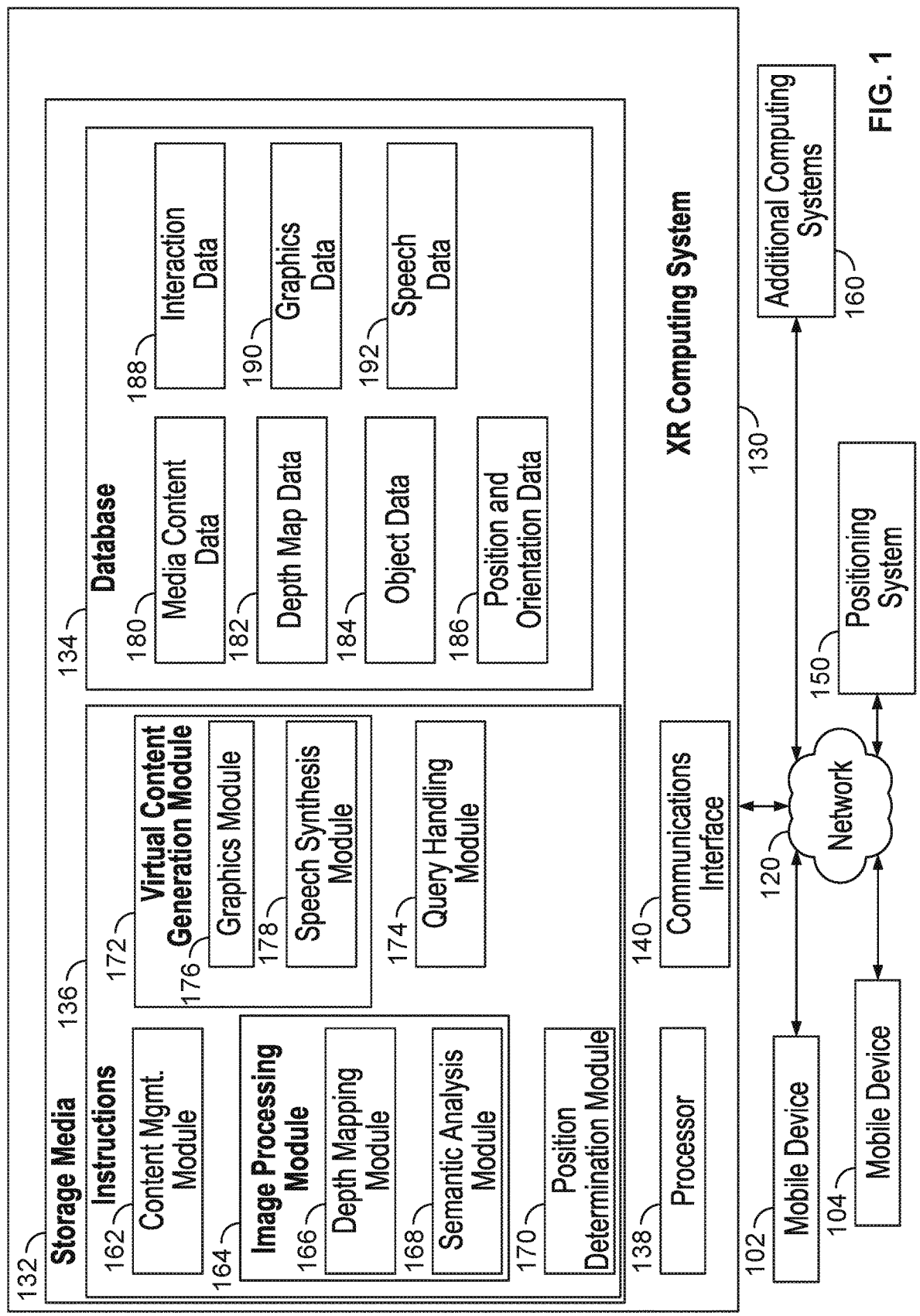
FIG. 1 is a block diagram of an exemplary network for an augmented reality environment, according to some examples.

While the features, methods, devices, and systems described herein can be embodied in various forms, some exemplary and non-limiting embodiments are shown in the drawings, and are described below. Some of the components described in this disclosure are optional, and some implementations can include additional, different, or fewer components from those expressly described in this disclosure.

Relative terms such as "lower," "upper," "horizontal," "vertical,", "above," "below," "up," "down," "top" and "bottom" as well as derivative thereof (e.g., "horizontally," "downwardly," "upwardly," etc.) refer to the orientation as then described or as shown in the drawing under discussion. Relative terms are provided for the reader's convenience. They do not limit the scope of the claims.

Many virtual assistant technologies, such as software pop-ups and voice-call assistants have been designed for telecommunications systems. The present disclosure provides a virtual assistant that exploits the potential of extended reality environments, such as virtual reality environments, augmented reality environments, and augmented virtuality environments.

Examples of extended reality environments in a mobile computing context are described below. In some examples described below, extended reality generation and presentation tools are accessible by a mobile device, and by a computing system associated with an extended reality platform. Extended reality generation and presentation tools define an extended reality environment based on certain elements of digital content, such as captured digital video, digital images, digital audio content, or synthetic audio-visual content (e.g., computer generated images and animated content). The tools can deploy the elements of digital content on a mobile device for presentation to a user through a display, such as a head-mountable display (HMD), incorporated within an extended, virtual, or augmented reality headset.

The mobile device can include augmented reality eyewear (e.g., glasses, goggles, or any device that covers a user's eyes) having one or more lenses or displays for displaying graphical elements of the deployed digital content. For example, the eyewear can display the graphical elements as augmented reality layers superimposed over real-world objects that are viewable through the lenses. Additionally, portions of the digital content deployed to the mobile device—which establishes the augmented or other extended reality environment for the user of that mobile device—can also be deployed to other mobile devices. Users of the other mobile devices can access the deployed portions of the digital content using their respective mobile devices to explore the augmented or other extended reality environment.

The user of the mobile device may also explore and interact with the extended reality environment (e.g., as presented by the HMD) via gestural or spoken input to the mobile device. For example, the mobile device can apply gesture-recognition tools to the gestural input to determine a context of that gestural input and perform additional operations corresponding to the determined context. The gestural input can be detected by a digital camera incorporated into or in communication with the mobile device, or by various sensors incorporated into or in communication with the mobile device. Examples of these sensors include, but are not limited to, an inertial measurement unit (IMU) incorporated into the mobile device, or an IMU incorporated into a wearable device (e.g., a glove) and in communication with the mobile device. In other examples, a microphone or other interface within the mobile device can capture an utterance spoken by the user. The mobile device can apply speech recognition tools or natural-language processing algorithms to the captured utterance to determine a context of the spoken utterance and perform additional operations corresponding to the determined context. For example, the additional operations can include presentation of additional elements of digital content corresponding to the user's navigation through the augmented reality environment. Other examples include processes that obtain information from one or more computing systems in response to a query spoken by the user.

The gestural or spoken input may request an item of virtual content, such as a virtual assistant, within the extended reality environment established by the mobile device (e.g., may "invoke" the virtual assistant). By way of example, the virtual assistant can include elements of animated digital content and synthesized audio content for presentation within an appropriate and contextually relevant portion of the extended reality environment. When rendered by an HMD or mobile device, the animated digital content elements and audio content elements facilitate an enhanced interaction between the user and the extended reality environment and preserve the user's connection with the "real" world (outside the extended reality environment). In some instances, the virtual assistant can be associated with a library or collection of synthesized audio content that responds to utterances spoken by the user. Such audio content can describe objects of interest disposed within the extended reality environment, utterances indicating the actual, real-world time or date throughout the user's interaction with the augmented reality environment, or indicate hazards or other dangerous conditions present within the user's actual environment.

The virtual assistant, when rendered for presentation within the extended reality environment, may also interact with the user and elicit additional gestural or spoken queries by the user to the mobile device. For example, the extended reality environment may include an augmented reality environment that corresponds to a meeting attended by multiple, geographically dispersed colleagues of the user, and the virtual assistant can prompt the user to make spoken queries to the mobile device requesting that the virtual assistant record the meeting for subsequent review. In other examples, the virtual assistant accesses certain elements of digital content (e.g., video content, images, etc.) and presents that digital content within a presentation region of the augmented reality environment (e.g., an augmented reality whiteboard).

The mobile device can capture the spoken queries through the microphone or other interface, and can apply one or more of the speech recognition tools or natural-language processing algorithms to the captured queries to determine a context of the spoken queries. The virtual assistant can perform additional operations corresponding to the determined context, either alone or through an exchange of data with one or more other computing systems. By facilitating the user's interaction with both the augmented reality environment and the real world, the virtual assistant creates an immersive augmented-reality experience for the user. The virtual assistant may increase adoption of augmented reality technologies and foster multi-user collaboration within the augmented reality environment.

In response to the captured gestural or spoken input—which invokes the virtual assistant within the extended reality environment—the extended reality computing system or the mobile device can determine a portion of the virtual environment (e.g., a "scene") currently visible to the user through the HMD or augmented reality eyewear. The extended reality computing system or the mobile device can apply various image processing tools to generate data (e.g., a scene depth map) that establishes, and assigns to each pixel within the scene, a value characterizing a depth of a position within the extended reality environment that corresponds to the pixel. In some examples, the extended reality computing system or the mobile device also applies various semantic scene analysis processes to the visible portions of the extended reality environment and the scene depth map to identify and characterize objects disposed within the extended reality environment and to map the identified objects to positions within the extended reality environment and the scene depth map.

The extended reality computing system or the mobile device can also determine a position and orientation of the mobile device (e.g., a position and orientation of the HMD or the augmented reality eyewear) within the extended reality environment, and can further obtain data indicating a position and orientation of one or more other users within the extended reality environment. In one example, the position of a user within the extended reality environment may be determined based on latitude, longitude, or altitude values of a mobile device operated or worn by that user. Similarly, the extended reality computing system or the mobile device can define an orientation of a user within the extended reality environment based on a determined orientation of a mobile device operated or worn by the user. For example, the determined orientation of the mobile device, e.g., a device pose, can be established based on one or more of roll, pitch, and/or yaw values of the mobile device. Further, the position or orientation of the user and the mobile device can be based upon one or more positioning signals and/or inertial sensor measurements that are obtained or received at the mobile device, as described in detail below.

In additional examples, the orientation of a user in the extended reality environment may correspond to an orientation of at least a portion of a body of that user within the extended reality environment. For instance, the orientation of the user may be established based on an orientation of a portion of the user's body with respect to a portion of a mobile device operated or worn by the user, such as an orientation of a portion of the user's head with respect to a display surface of the mobile device (e.g., a head pose). In other instances, the mobile device may include or be incorporated a head-mountable display, and the extended reality computing system or the mobile device can define the orientation of the user based on a determined orientation of at least one the user's eyes with respect to a portion of the head-mountable display. For example, the head-mountable display can include augmented reality eyewear, and the extended reality computing system or the mobile device can define the user's orientation as the orientation of the user's left (or right) eye with respect to a corresponding lens of the augmented reality eyewear.

Based on the generated scene depth map, an outcome of the semantic processes, and the data characterizing the positions and orientations of the users or mobile devices within the extended reality environment, the extended reality computing system or the mobile device can establish a plurality of candidate positions of the virtual assistant within the extended reality environment, and can compute placement scores that characterize a viability of each of the candidate positions for the virtual assistant.

Additionally, the extended reality computing system or the mobile device can compute a placement score for a particular candidate position reflecting physical constraints imposed by the extended reality environment. For example, the presence of a hazard at the particular candidate position (e.g., a lake, a cliff, etc.) may result in a low placement score. In another example, if an object disposed at the particular candidate position is not suitable to support the virtual assistant (e.g., a bookshelf or table disposed at the candidate position), the extended reality computing system or the mobile device can compute a low placement score for that candidate position, whereas a chair disposed at the candidate position may result in a high placement score. In other examples, the extended reality computing system or the mobile device computes the placement score for the particular candidate position based at least partially on additional factors. The additional factors can include, but are not limited to, a viewing angle of the virtual assistant at the particular candidate position relative to other users disposed within the extended reality environment, displacements between the particular candidate position and position of the other users within the augmented reality environment, a determined visibility of a face of each of the other users to the virtual assistant disposed at the particular candidate position, and interactions between all or some of the users disposed within the augmented reality environment.

The extended reality computing system or the mobile device can determine a minimum of the computed placement scores, and identify the candidate position associated with the minimum of the computed placement scores. The extended reality computing system or the mobile device selects (establishes) the identified candidate position as the position of the item of virtual content, such as the virtual assistant, within the augmented reality environment.

As described in detail below, the extended reality computing system or the mobile device can generate the item of virtual content (e.g., a virtual assistant generated through animation and speech-synthesis tools). The extended reality computing system or the mobile device can generate instructions that cause the display unit (e.g., the HMD) to present the item of virtual content at the corresponding position within the augmented reality environment. The extended reality computing system or the mobile device can modify one or more visual characteristics of the item of virtual content in response to additional gestural or spoken input, such as that representing user interaction with the virtual assistant.

The extended reality computing system or the mobile device can also modify the position of the item of virtual content within the extended reality environment in response to a change in the state of the mobile device or the display unit (e.g., a change in the position or orientation of the mobile device or display unit within the extended reality environment). The extended reality computing system or the mobile device can modify the position of the item of virtual content, based on a detection of gestural input that directs the item of virtual content to an alternative position within the extended reality environment (e.g., a position proximate to an object of interest to the user within the augmented reality environment).

FIG. 1 is a schematic block diagram of an exemplary network environment 100. Network environment 100 can include any number of mobile devices such as mobile devices 102 and 104, for example. Mobile devices 102 and 104 can establish and enable access to an extended reality environment by corresponding users. As described herein, examples of extended reality environments include, but are not limited to, a virtual reality environment, an augmented reality environment, or an augmented virtuality environment. Mobile devices 102 and 104 may include any suitable mobile computing platform, such as, but not limited to, a cellular phone, a smart phone, a personal digital assistant, a low-duty-cycle communication device, a laptop computer, a portable media player device, a personal navigation device, and a portable electronic device comprising a digital camera.

Further, in some examples, mobile devices 102 and 104 also include (or correspond to) a wearable extended reality display unit, such an HMD that presents stereoscopic graphical content and audio content establishing the extended reality environment for corresponding users. In other examples, mobile devices 102 and 104 include augmented reality eyewear (e.g., glasses) that include one or more lenses for displaying graphical content (such as augmented reality information layers) over real-world objects that are viewable through such lenses to establish an augmented reality environment. Mobile devices 102 and 104 may be operated by corresponding users, each of whom may access the extended reality environment using any of the processes described below, and be disposed at corresponding positions within the accessed extended reality environment.

Network environment 100 can include an extended reality (XR) computing system 130, a positioning system 150, and one or more additional computing systems 160. The mobile devices 102 and 104 can communicate wirelessly with XR computing system 130, positioning system 150, and additional computing systems 160 across a communications network 120. Communications network 120 can include one or more of a wide area network (e.g., the Internet), a local area network (e.g., an intranet), and/or a personal area network. For example, mobile devices 102 and 104 can communicate wirelessly with XR computing system 130, and with additional computing systems 160, via any suitable communication protocol, including cellular communication protocols such as code-division multiple access (CDMA®), Global System for Mobile Communication (GSM®), or Wideband Code Division Multiple Access (WCDMA®) and/or wireless local area network protocols such as IEEE 802.11 (WiFi®) or Worldwide Interoperability for Microwave Access (WiMAX®). Accordingly, communications network 120 can include one or more wireless transceivers. Mobile devices 102 and 104 can also use wireless transceivers of communications network 120 to obtain positioning information for estimating mobile device position.

Mobile devices 102 and 104 can use a trilateration based approach to estimate a corresponding geographic position. For example, mobile devices 102 and 104 can use techniques including Advanced Forward Link Trilateration (AFLT) in CDMA® or Enhanced Observed Time Difference (EOTD) in GSM® or Observed Time Difference of Arrival (OTDOA) in WCDMA®. OTDOA measures the relative times of arrival of wireless signals at a mobile device, where the wireless signals are transmitted from each of several transmitters equipped base stations. As another example, mobile device 102 or 104 can estimate its position by obtaining a Media Access Control (MAC) address or other suitable identifier associated with a wireless transceiver and correlating the MAC address or identifier with a known geographic location of that wireless transceiver.

Mobile devices 102 or 104 can further obtain wireless positioning signals from positioning system 150 to estimate a corresponding mobile device position. For example, positioning system 150 may comprise a Satellite Positioning System (SPS) and/or a terrestrial based positioning system. Satellite positioning systems may include, for example, the Global Positioning System (GPS), Galileo, GLONASS, NAVSTAR, GNSS, a system that uses satellites from a combination of the positioning systems listed above, or any SPS developed in the future. As used herein, an SPS can include pseudolite systems. Particular positioning techniques described herein are merely examples of positioning techniques, and do not limit the claimed subject matter.

XR computing system 130 can include one or more servers and/or other suitable computing platforms. Accordingly, XR computing system 130 can include a non-transitory, computer-readable storage medium ("storage media") 132 having database 134 and instructions 136 stored thereon. XR computing system 130 can include one or more processors, such as processor 138 for executing instructions 136 or for facilitating storage and retrieval of data at database 134. XR computing system 130 can further include a communications interface 140 for facilitating communication with clients of communications network 120, including mobile devices 102 and 104, positioning system 150, and additional computing systems 160.

To facilitate understanding of the examples, some instructions 136 are at times described in terms of one or more modules for performing particular operations. As one example, instructions 136 can include a content management module 162 to manage the deployment of elements of digital content, such as digital graphical and audio content, to mobile devices 102 and 104. The graphical and audio content can include captured digital video, digital images, digital audio, or synthesized images or video. Mobile devices 102 and 104 can present portions of the deployed graphical or audio content though corresponding display units, such as an HMD or lenses of augmented reality eyewear, and can establish an extended reality environment at each of mobile devices 102 and 104. The established extended reality environment can include graphical or audio content that enables users of mobile device 102 or 104 to visit and explore various historical sites and locations within the extended reality environment, or to participate in a virtual meeting attended by various, geographically dispersed participants.

Instructions 136 can also include an image processing module 164 to process images representing portions of the extended reality environment visible to a user of mobile device 102 or a user of mobile device 104 (e.g., through a corresponding HMD or through lenses of augmented reality eyewear). For example, image processing module 164 can include, among other things, a depth mapping module 166 that generates a depth map for each of the visible portions of the extended reality environment, and a semantic analysis module 168 that identifies and characterizes objects disposed within the visible portions of the extended reality environment.

As an example, depth mapping module 166 can receive images representative of that portion of an extended reality environment visible to the user of mobile device 102 through a corresponding HMD. Depth mapping module 166 can generate a depth map that correlates each pixel of one or more images to a corresponding position within the extended reality environment. Depth mapping module 166 can compute a value that characterizes a depth of each of the corresponding positions within the extended reality environment, and associate the computed depth with the corresponding position within the depth map. In some examples, the received images include a stereoscopic pair of images that each represent the visible portion of the extended reality environment from a slightly different viewpoint (e.g., corresponding to a left lens and a right lens of the HMD or augmented reality eyewear). Further, each position within the visible portion of the extended reality environment can be characterized by an offset (measured in pixels) between the two images. The offset is proportional to a distance between the position and the user of mobile device 102 within the extended reality environment.

Depth mapping module 166 can further establish the pixel offset as the depth value characterizing the position within the generated depth map. For example, depth mapping module 166 can establish a value proportional to that pixel offset as the depth value characterizing the position within the depth map. Depth mapping module 166 can also establish a mapping function (e.g., a feature-to-depth mapping function) that correlates certain visual characteristics of the images of the visible portion of the extended reality environment to corresponding depth values, as set forth in the depth map. Depth mapping module 166 can further process the data characterizing the images to identify a color value for each image pixel. Depth mapping module 166 can apply one or more appropriate statistical techniques (e.g., regression, etc.) to the identified color values and to the depth values set forth in the depth map to generate the mapping function and correlate the color values of the pixels to corresponding depths within the visible portion of the extended reality environment.

The subject matter is not limited to the examples of depth-mapping processes described above, and depth mapping module 166 can apply additional or alternative image processing technique to the images to generate the depth map characterizing the visible portion of the extended reality environment. For example, depth mapping module 166 can process a portion of the images to determine a similarity with prior image data characterizing a previously visible portion of the extended reality environment (e.g., as visible to the user of mobile device 102 or 104 through the corresponding HMD). In response to the determined similarity, depth mapping module 166 can access database 134 and obtain data specifying the mapping function for the previously visible portion of the extended reality environment. Depth mapping module 166 can determine color values characterizing the pixels of the portion of the images, apply the mapping function to the determined color values, and generate the depth map for the portion of the images directly and based on an output of the applied mapping function.

Referring back to FIG. 1, semantic analysis module 168 can process the images (e.g., which represent the visible portion of the extended reality environment) and apply one or more semantic analysis techniques to identify and characterize objects disposed within the visible portion of the extended reality environment. For example, semantic analysis module 168 can access image data associated with a corresponding one of the images, and can apply one or more appropriate computer-vision algorithms or machine-vision algorithms to the accessed image data. The computer-vision algorithms or machine-vision algorithms identify objects within the corresponding one of the images, and the location of the identified objects within the corresponding one of the images, and thus, the locations of the identified objects within the visible portion of the extended reality environment.

The applied computer-vision or machine-vision algorithms may rely on data stored locally by XR computing system 130 (e.g., within database 134). Semantic analysis module 168 can obtain data supporting the application of the computer-vision or machine-vision algorithms from one or more computing systems across communications network 120, such as additional computing systems 160. For example, semantic analysis module 168 can perform operations that provide data facilitating an image-based search for portions of the accessed image data to a corresponding one of additional computing systems 160 via a corresponding programmatic interface. The examples are not limited to semantic analysis techniques and image-based searches described above. Semantic analysis module 168 can further apply an additional or alternative algorithm or technique to the obtained image data, either alone or in conjunction with additional computing systems 160, to identify and locate objects within the visible portion of the extended reality environment.

Based on an outcome of the applied computer-vision or machine-vision algorithms, or on an outcome of the image-based searches, semantic analysis module 168 can generate data (e.g., metadata) that specifies each of the identified objects and the corresponding locations within visible portions of the augmented reality environment. Semantic analysis module 168 can also access the generated depth map for the visible portion of the augmented reality environment, and correlate depth values characterizing the visible portion of the augmented reality environment to the identified objects and the corresponding locations.

Referring back to FIG. 1, instructions 136 can also include a position determination module 170, a virtual content generation module 172, and a query handling module 174. Position determination module 170 can perform operations that establish a plurality of candidate positions of an item of virtual content, such as a virtual assistant, within the extended reality environment established by mobile devices 102 and 104. Position determination module 170 provides a means for determining a position for placement of the item of virtual content in the extended reality environment at least partially based on the determined position and orientation of the user. Position determination module 170 can compute placement scores that characterize a viability of each of the candidate positions of the item of virtual content within the augmented or other reality environment. As described below, the placement scores can be computed based on the generated depth map data, the data specifying the objects within the visible portion of the extended reality environment, data characterizing a portion and an orientation of each user within the extended reality environment, or data characterizing a level of interaction between users within the extended reality environment.

The computed placement score for a particular candidate position can reflect physical constraints imposed by the extended reality environment. As described above, the presence of a hazard at the particular candidate position (e.g., a lake, a cliff, etc.) may result in a low placement score whereas, if an object disposed at the particular candidate position is not suitable to support the item of virtual content (e.g., a bookshelf or table disposed at the candidate position of the virtual assistant), the extended reality computing system can compute a low placement score for that candidate position. The computed placement score for the particular candidate position can also reflect additional factors (e.g., a viewing angle of the virtual assistant relative to other users disposed within the extended reality environment when the virtual assistant is at the particular candidate position, displacements between the particular candidate position and position of the other users within the extended reality environment, a determined visibility of a face of each of the other users to the virtual assistant disposed at the particular candidate position, and/or interactions between some or all of the users within the augmented or other extended reality environment). Position determination module 170 can determine a minimum of the computed placement scores, identify the candidate position associated with the minimum computed placement score, and select and establish the identified candidate position as the position of the item of virtual content within the extended reality environment.

Virtual content generation module 172 can perform operations that generate and instantiate the item of virtual content, such as the virtual assistant, at the established position within the extended reality environment, e.g., as visible to the user of mobile device 102 or the user of mobile device 104. For example, virtual content generation module 172 can include a graphics module 176 that generates an animated representation of the virtual assistant based on locally stored data (e.g., within database 134) that specifies visual characteristics of the virtual assistant, such as visual characteristics of an avatar selected by the user of mobile device 102 or the user of mobile device 104. Virtual content generation module 172 can also include a speech synthesis module 178, which generates audio content representing portions of an interactive dialogue spoken by the virtual assistant within the extended reality environment. In some examples, speech synthesis module 178 generates the audio content, and the portions of the interactive, spoken dialogue, based on speech parameters locally stored by XR computing system 130. The speech parameters can specify a regional dialect or a language spoken by the user of mobile device 102 or 104, for example.

Query handling module 174 can perform operations that receive query data specifying one or more queries from mobile device 102 or mobile device 104. Query handling module 174 can obtain data in response to the queries (e.g., data locally stored within storage media 132 or obtained from additional computing systems 160 across communications network 120). Query handling module 174 can provide the obtained data to mobile device 102 or mobile device 104 in response to the received query data. For example, the extended reality environment established by mobile device 102 can include a virtual tour of the pyramid complex at Giza, Egypt, and in response to synthesized speech by a virtual assistant, the user of mobile device 102 can utter a query requesting additional information on construction practices employed during the construction of the Great Pyramid. As described below, a speech recognition module of mobile device 102 can process the uttered query—e.g., using any appropriate speech-recognition algorithm or natural-language processing algorithm—and generate textual query data; a query module in mobile device 102 can package the textual query data and transmit the textual query data to XR computing system 130.

Query handling module 174 can receive the query data, as described above, generate or obtain data that reflects and responds to the received query data (e.g., based on data stored locally within storage media 132 or obtained from additional computing systems 160). For example, query handling module 174 can perform operations that request and obtain information characterizing the construction techniques employed during the construction of the Great Pyramid from one or more of additional computing systems 160 (e.g., through an appropriate, programmatic interface). Query handling module 174 can then transmit the obtained information to mobile device 102 as a response to the query data.

Prior to transmitting the response to mobile device 102, speech synthesis module 178 can access and process the obtained information to generate audio content that the virtual assistant can present to the user of mobile device 102 within the extended reality environment (e.g., "spoken" by the virtual assistant in response to the user's query).

Query handling module 174 can also transmit the obtained information to mobile device 102 without additional processing or speech synthesis. A local speech synthesis module maintained by mobile device 102 can process the obtained information and generate synthesized speech the virtual assistant can present using any of the processes described herein.

Database 134 may include a variety of data, such as media content data 180—e.g., captured digital video, digital images, digital audio, or synthesized images or video suitable for deployment to mobile device 102 or mobile device 104—to establish corresponding instances of the extended reality environment (e.g., based on operations performed by content management module 162). Database 134 may also include depth map data 182, which includes depth maps and data specifying mapping functions for corresponding visible portions of the extended reality environment instantiated by mobile devices 102 or 104. Database 134 may also include object data 184, which includes metadata identifying the objects and their locations within the corresponding visible portions (and further, data correlating the positions of the objected to corresponding portions of depth map data 182).

Database 134 can also include position and orientation data 186 identifying positions and orientations of the users of mobile device 102 and mobile device 104 within corresponding portions of the extended reality environments, and interaction data 188 characterizing a level or scope of interaction between the users in the extended reality environment. For example, a position of a mobile device can be represented as one or more latitude, longitude, or altitude values measured relative to a reference datum, and the position of the mobile device can represent the position of the user of that mobile device. Further, and as described herein, the orientation of the mobile device can be represented by one or more of roll, pitch, and/or yaw values measured relative to an additional or alternative reference datum, and the orientation of the user can be represented as the orientation of the mobile device. In other examples, the orientation of the user can be determined based on an orientation of at least a portion of the user's body with respect to the extended reality environment or with respect to a portion of the mobile device, such as a display surface of the mobile device. Further, in some examples, interaction data 188 can characterize a volume of audio communication between the users within the augmented or other extended reality environment, and source and target users of that audio communication, as monitored and captured by XR computing system 130.

Database 134 may further include graphics data 190 and speech data 192. Graphics data 190 may include data that facilitates and supports generation of the item of virtual content, such as the virtual assistant, by virtual content generation module 172. For example, graphics data 190 may include, but is not limited to, data specifying certain visual characteristics of the virtual assistant, such as visual characteristics of an avatar selected by the user of mobile device 102 or the user of mobile device 104. Further, by way of example, speech data 192 may include data that facilitates and supports a synthesis of speech suitable for presentation by the virtual assistant in the extended reality environment, such as a regional dialect or a language spoken by the user of mobile device 102 or 104.

Figure 2:
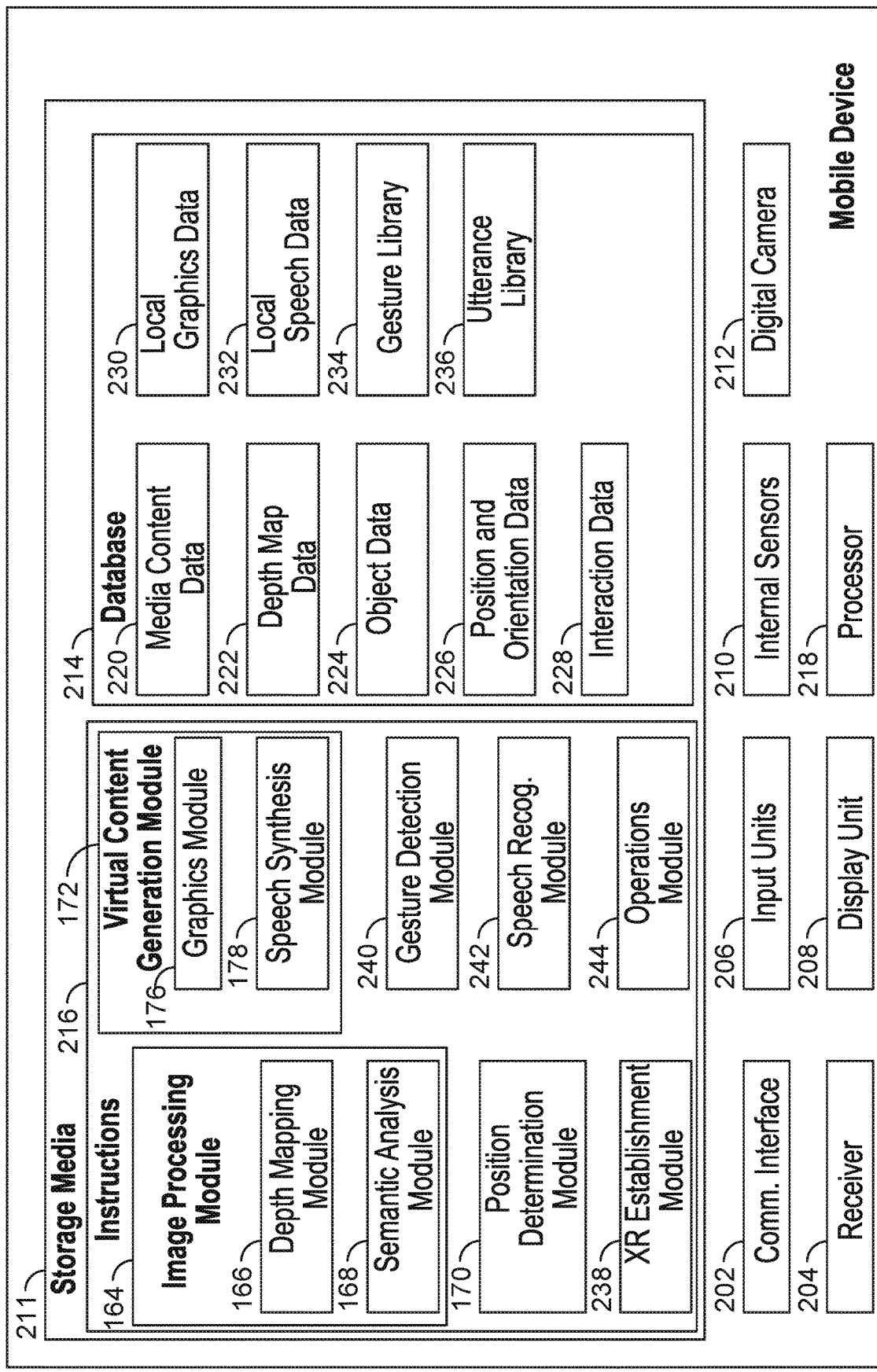
FIG. 2 is a block diagram of an exemplary mobile device for use in the augmented reality environment of FIG. 1, according to some examples.

FIG. 2 is a schematic block diagram of an exemplary mobile device 200. Mobile device 200 is a non-limiting example of mobile devices 102 and 104 of FIG. 1 for at least some examples. Accordingly, mobile device 200 can include a communications interface 202 to facilitate communication with other computing platforms, such as XR computing system 130, other mobile devices (e.g., mobile device 102 and 104), positioning system 150, and/or additional computing systems 160, for example. Hence, communications interface 202 can enable wireless communication with communication networks, such as communications network 120. Mobile device 200 can also include a receiver 204 (e.g., a GPS receiver or an SPS receiver) to receive positioning signals from a positioning system, such as positioning system 150 of FIG. 1. Receiver 204 provides a means for determining a position of the mobile device 200—and hence, a user wearing or carrying the mobile device—in an extended reality environment.

Mobile device 200 can include one or more input units, e.g., input units 206, that receive input from a corresponding user. Examples of input units 206 include, but are not limited to, one or more physical buttons, keyboards, controllers, microphones, pointing devices, and/or touch-sensitive surfaces.

Mobile device 200 can be in the form of a wearable extended reality display unit, such a head-mountable display (HMD) that presents stereoscopic graphical content and audio content establishing the extended reality environment. Mobile device 200 can also be in the form of augmented reality eyewear or glasses that include one or more lenses for displaying graphical content, such as augmented reality information layers over real-world objects that are viewable through the lenses and that establish an augmented reality environment. Mobile device 200 can include a display unit 208, such as a stereoscopic display that displays graphical content to the corresponding user, such that the graphical content establishes the augmented or other extended reality environment at mobile device 200. Display unit 208 can be incorporated into the augmented reality eyewear or glasses and can further be configured to display the augmented reality information layers superimposed over the real-world objects visible through a single one of the lenses, or alternatively, over both of the lenses. Mobile device 200 can also include one or more output devices (not shown), such as an audio speaker or a headphone jack for presenting audio content as a portion of the extended reality environment.

Mobile device 200 can include one or more inertial sensors 210, which collect inertial sensor measurements that characterize mobile device 200. The inertial sensors 210 provide a means for establishing the orientation of mobile device 200—and hence, a user wearing or carrying mobile device 200—within the extended reality environment. Examples of suitable inertial sensors 210 include, but are not limited to, an accelerometer, a gyroscope, or another suitable device for measuring an inertial state of mobile device 200. The inertial state of mobile device 200 can be measured by inertial sensors 210 along multiple axes in Cartesian and/or polar coordinate systems, to provide an indication for establishing a position or an orientation of mobile device 200. Mobile device 200 can also process (e.g., integrate over time) data indicative of the inertial sensor measurements obtained from inertial sensors 210 to generate estimates of mobile device position or orientation. As discussed above, the position of mobile device 200 can be specified by values of latitude, longitude, or altitude, and the orientation of mobile device 200 can be specified by values of roll, pitch, or yaw values measured relative to reference values.

Mobile device 200 can include a digital camera 212 configured to capture digital image data identifying one or more gestures or motions of the user, such as predetermined gestures formed using the user's hand or fingers, or a pointing motion effected by the user's hand and arm. Digital camera 212 can comprise a digital camera having a number of optical elements (not shown). The optical elements can include one or more lenses for focusing light and/or one or more light sensing elements for converting light into digital signals representative of image and/or video data. As a non-limiting example, a light sensing element can comprise an optical pickup, charge-coupled device and/or photoelectric device for converting light into digital signals. As described below, mobile device 200 can be configured to detect one of the motions or gestures based on the digital image data captured by digital camera 212, identify an operation associated with the corresponding motion or gesture, and initiate performance of that operation in response to the detected motion or gesture. Such operations can invoke, revoke, or re-position an item of virtual content, such as a virtual assistant, within the extended reality environment, for example.

Mobile device 200 can further include a non-transitory, computer-readable storage medium ("storage media") 211 having a database 214 and instructions 216 stored thereon. Mobile device 200 can include one or more processors, e.g., processor 218, for executing instructions 216 and/or facilitating storage and retrieval of data at database 214 to perform a computer-implemented extended reality method. Database 214 can include a variety of data, including some or all of the data elements described above with reference to database 134 of FIG. 1. Database 214 can also maintain media content data 220, including elements of captured digital video, digital images, digital audio, or synthesized images or video that establishes the extended reality environment at mobile device 200, when displayed to the user through display unit 208. Mobile device 200 may further receive portions of media content data 220 from XR computing system 130 (e.g., through communications interface 202 using any appropriate communications protocol) at regular, predetermined intervals (e.g., a "push" operation) or in response to requests transmitted from mobile device 200 to XR computing system 130 (e.g., a "pull" operation).

Database 214 can include depth map data 222, comprising depth maps and data specifying mapping functions for corresponding visible portions of the extended reality environment instantiated by mobile device 200. Database 214 can also include object data 224, comprising metadata identifying the objects and their locations within the corresponding visible portions (and data correlating the positions of the objected to corresponding portions of depth map data 222). Mobile device 200 may receive portions of depth map data 222 or object data 224 from XR computing system 130 (e.g., as generated by depth mapping module 166 or semantic analysis module 168, respectively). In other instances, described below in greater detail, processor 218 can execute portions of instructions 216 to generate local portions of the depth map data 222 or object data 224.

Further, similar to portions of database 134 described above, database 214 can maintain local copies of position and orientation data 226 identifying positions and orientations of the users of mobile device 200 (and other mobile devices within network environment 100, such as mobile devices 102 and 104) within corresponding portions of the extended reality environments. Database 214 can also maintain local copies of interaction data 228 characterizing a level or scope of interaction between the users in the extended reality environment. Database 214 can further include local copies of graphics data 230 and speech data 232. In some examples, the local copy of graphics data 230 includes data that facilitates and supports generation of the virtual assistant by mobile device 200 (e.g., through the execution of portions of instructions 216). The local copy of graphics data 230 can include, but is not limited to, data specifying visual characteristics of the virtual assistant, such as visual characteristics of an avatar selected by the user of mobile device 200. Further, as described above, the local copy of speech data 232 can include data that facilitates and supports a synthesis of speech suitable for presentation by the virtual assistant once instantiated in the extended reality environment, such as a regional dialect or a language spoken by the user of mobile device 200.

Additionally, database 214 may also include a gesture library 234 and a spoken input library 236. Gesture library 234 may include data that identifies one or more candidate gestural inputs (e.g., hand gestures, pointing motions, facial expressions, or the like). The gestural input data correlates the candidate gestural inputs with operations, such as invoking a virtual assistant (or other item of virtual content) within the extended reality environment, reviving that virtual assistant or other item of virtual content, or repositioning the virtual assistant or item of virtual content within the extended reality environment. Spoken input library 236 may further include textual data representative of one or more candidate spoken inputs and additional data that correlates the candidate spoken inputs to certain operations, such as operations that invoke the virtual assistant or item of virtual content, revoke that virtual assistant or item of virtual content, reposition the virtual assistant or item of virtual content, or request calendar data. The subject matter is not limited to the examples of correlated operations described above, and in other instances, gesture library 234 and a spoken input library 236 may include data correlating any additional or alternative gestural or spoken input detectable by mobile device 200 to any additional or alternative operation performed by mobile device 200 or XR computing system 130.

Instructions 216 can include one or more of the modules and/or tools of instructions 136 described above with respect to FIG. 1. For brevity, descriptions of the common modules and/or tools included in both FIGS. 1 and 2 are not repeated. For example, instructions 216 may include image processing module 164, which may in turn include depth mapping module 166 and semantic analysis module 168. Further, instructions 216 may also include position determination module 170, virtual content generation module 172, graphics module 176, and speech synthesis module 178, as described above in reference to the modules within instructions 136 of FIG. 1.

In further examples, instructions 216 also include an extended reality establishment module, e.g., XR establishment module 238, to access portions of storage media 211, e.g., media content data 220, and extract elements of captured digital video, digital images, digital audio, or synthesized images. XR establishment module 238, when executed by processor 218, can cause mobile device 200 to render and present portions of the captured digital video, digital images, digital audio, or synthesized images to the user through display unit 208, which establishes the extended reality environment for the user at mobile device 200.

Instructions 216 can also include a gesture detection module 240, a speech recognition module 242, and an operations module 244. In some examples, gesture detection module 240 accesses digital image data captured by digital camera 212, and can apply one or more image processing techniques, computer-visional algorithms, or machine-vision algorithms to detect a human gesture disposed within a single frame of the digital image data. The digital image data may contain a hand gesture established by the user's fingers. Additionally, or alternatively, the digital image data may contain a human motion that occurs across multiple frames of the digital image data (e.g., a pointing motion of the user's arm, hand, or finger).

Operations module 244 can obtain data indicative of the detected gesture or motion, and based on portions of gesture library 234, identify an operation associated with that detected gesture or motion. In response to the identification, operations module 244 can initiate a performance of the associated operation by mobile device 200. As described above, the detected gesture or motion may correspond to a request from the user, to reposition an invoked item of digital content, such as a virtual assistant, to another portion of the extended reality environment. That is, the gesture detection module 240 can detect a gesture that provides additional information on an object disposed within the extended reality environment. The operations module 244 can cause mobile device 200 to perform operations that modify the placement position of the virtual assistant within the extended reality environment in accordance with the detected gestural input.

In other instances, speech recognition module 242 can access audio data, which includes an utterance spoken by the user and captured by a microphone incorporated into mobile device 200. Speech recognition module 242 can apply one or more speech-recognition algorithms or natural-language processing algorithms to parse the audio data and generate textual data corresponding to the spoken utterance. Based on portions of spoken input library 236, operations module 244 can identify an operation associated with all or a portion of the generated textual data, and initiate a performance of that operation by mobile device 200. For example, the generated textual data may correspond to the user's utterance of "open the virtual assistant." Operations module 244 can associate the utterance with a request by the user to invoke the virtual assistant and dispose the virtual assistant at a placement position that conforms to constraints imposed by the extended reality environment and is contextually relevant to, and enhances, the user's exploration of the augmented or other extended reality environment and interaction with other users.

Figure 3:
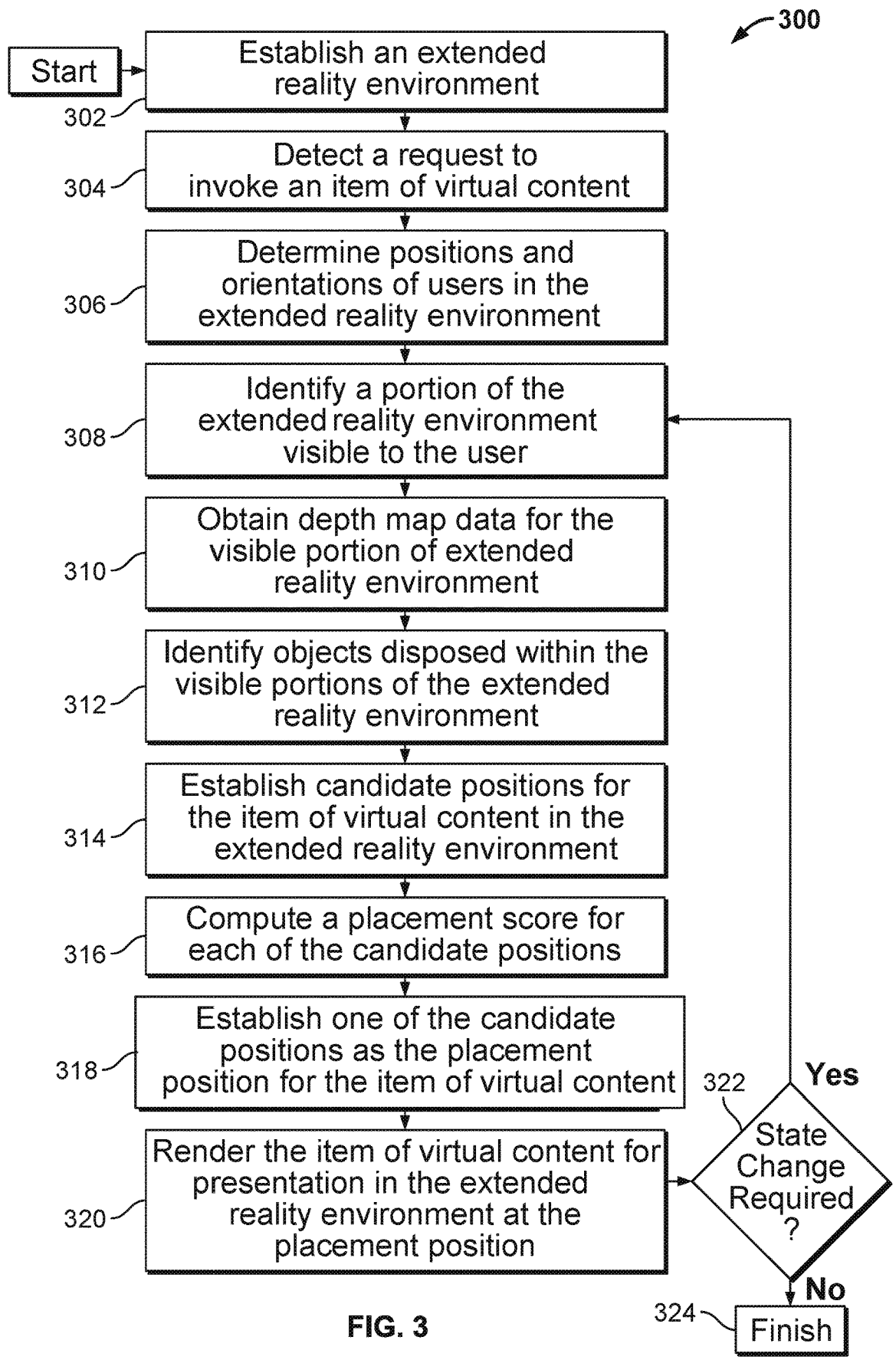
FIG. 3 is a flowchart of an exemplary process for dynamically positioning a virtual assistant within an augmented reality environment using the mobile device of FIG. 2, in accordance with some examples.

FIG. 3 is a flowchart of example process 300 for dynamically positioning a virtual assistant within an extended reality environment, in accordance with one implementation. Process 300 can be performed by one or more processors executing instructions locally at a mobile device, e.g., mobile device 200 of FIG. 2. Certain blocks of process 300 can be performed remotely by one or more processors of a server system or other suitable computing platform, such as XR computing system 130 of FIG. 1. Accordingly, the various operations of process 300 can be represented by executable instructions held in storage media of one or more computing platforms, such as storage media 132 of XR computing system 130 and/or storage media 211 of mobile device 200.

Referring to FIG. 3, mobile device 200 can establish an extended reality environment, such as an augmented reality environment (e.g., in block 302). XR computing system 130 can access stored media content data 220, which includes elements of captured digital video, digital images, digital audio, or synthesized images or video. Content management module 162, when executed by processor 138, can package portions of the captured digital video, digital images, digital audio, or synthesized images or video into corresponding data packages, which XR computing system 130 can transmit to mobile device 200 across communications network 120. Mobile device 200 can receive the transmitted data packets, and store the portions of the captured digital video, digital images, digital audio, or synthesized images or video within storage media 211, e.g., within media content data 220.

Figure 4A:
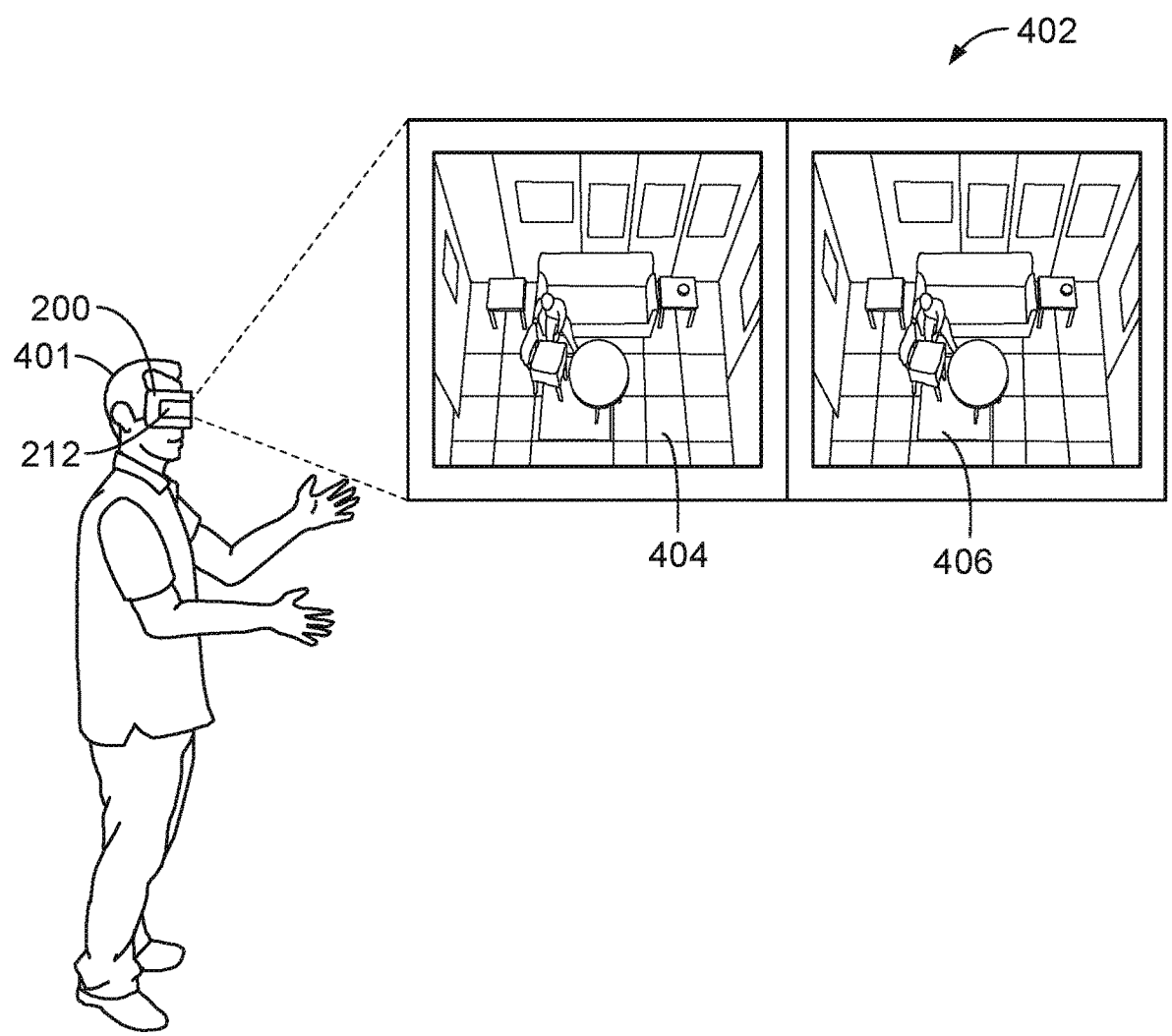
FIGS. 4A and 4B are diagrams illustrating an exemplary user interaction with an augmented reality environment using the mobile device of FIG. 2, in accordance with some examples.

XR establishment module 238, when executed by processor 218, can cause mobile device 200 to render and present portions of the captured digital video, digital images, digital audio, or synthesized images to the user through display unit 208, which establishes the augmented reality environment for the user at mobile device 200. As described above, the user may access the established augmented reality environment through a head-mountable display (HMD), which can present a stereoscopic view of the established augmented reality environment to the user. By way of example, as illustrated in FIG. 4A, stereoscopic view 402 may include a pair of stereoscopic images, e.g., image 404 and image 406, that, when displayed to the user on respective ones a left lens and a right lens of the HMD, establish a visible portion of the augmented reality environment to enable the user to perceive depth within the augmented reality environment.

Referring back to FIG. 3, mobile device 200 can receive user input that invokes generation and presentation of an item of virtual content, such as a virtual assistant, at a corresponding placement position within the visible portion of augmented reality environment (e.g., in block 304). The received user input may include an utterance spoken by the user (e.g., "open the virtual assistant"), which is captured by a microphone incorporated within mobile device 200. As described above, speech recognition module 242 can access the captured audio data and apply one or more speech-recognition algorithms or natural-language processing algorithms to parse the audio data and generate textual data corresponding to the spoken utterance. Further, operations module 244 can access information associating the textual data with corresponding operations (e.g., within spoken input library 236 of FIG. 2), and can establish that the spoken utterance represents a request to invoke the virtual assistant. In response to the established request, mobile device 200 can perform any of the exemplary processes described herein to generate the virtual assistant, determine a placement position for the virtual assistant that conforms to any constraints that may be imposed by the augmented reality environment, and insert the virtual assistant into the augmented reality environment at the placement position.

In other instances, mobile device 102 can transmit data specifying the established request across network 120 to XR computing system 130. XR computing system 130 can perform any of the exemplary processes described herein to generate the virtual assistant, determine a placement position for the virtual assistant that conforms to any constraints that may be imposed by the augmented reality environment (or any other extended reality environment), and transmit data specifying the generated virtual assistant and determined placement position across network 120 to mobile device 102. Mobile device 102 can then display the virtual assistant as an item of virtual content at the placement position within the augmented reality environment.

The subject matter is not limited to spoken input that invokes the placement of an item of virtual content within the augmented reality environment, when detected by mobile device 200. In other examples, digital camera 212 of mobile device 102 can capture digital image data that includes a gestural input provided by the user to mobile device 200, such as a hand gesture or a pointing motion. Mobile device 200 can perform any of the processes described herein to identify the gestural input, compute a correlation between the identified gestural input and the invocation of the virtual assistant (e.g., based on portions of stored gesture library 234), and based on the correlation, recognize that the gestural input represents the request to invoke the virtual assistant. Further, in other examples, the user may provide additional or alternate input to input units 206 of mobile device 200 (e.g., the one or more physical buttons, keyboards, controllers, microphones, pointing devices, and/or touch-sensitive surfaces) that requests the invocation of the virtual assistant.

In response to the detected request, mobile device 200 or XR computing system 130 can determine positions and orientations of one or more users that access the visible portion of the augmented reality environment (e.g., in block 306). The one or more users may include a first user that operates mobile device 200 (e.g., the user wearing the HMD or the augmented reality eyewear), and a second user that operates one or more of mobile device 102, mobile device 104, or other mobile devices within network environment 100. As described above, mobile device 200 can determine the mobile device's own position, and accordingly, the position of the user of mobile device 200, based on positioning signals received from positioning system 150 (e.g., via receiver 204).

Figure 4B:
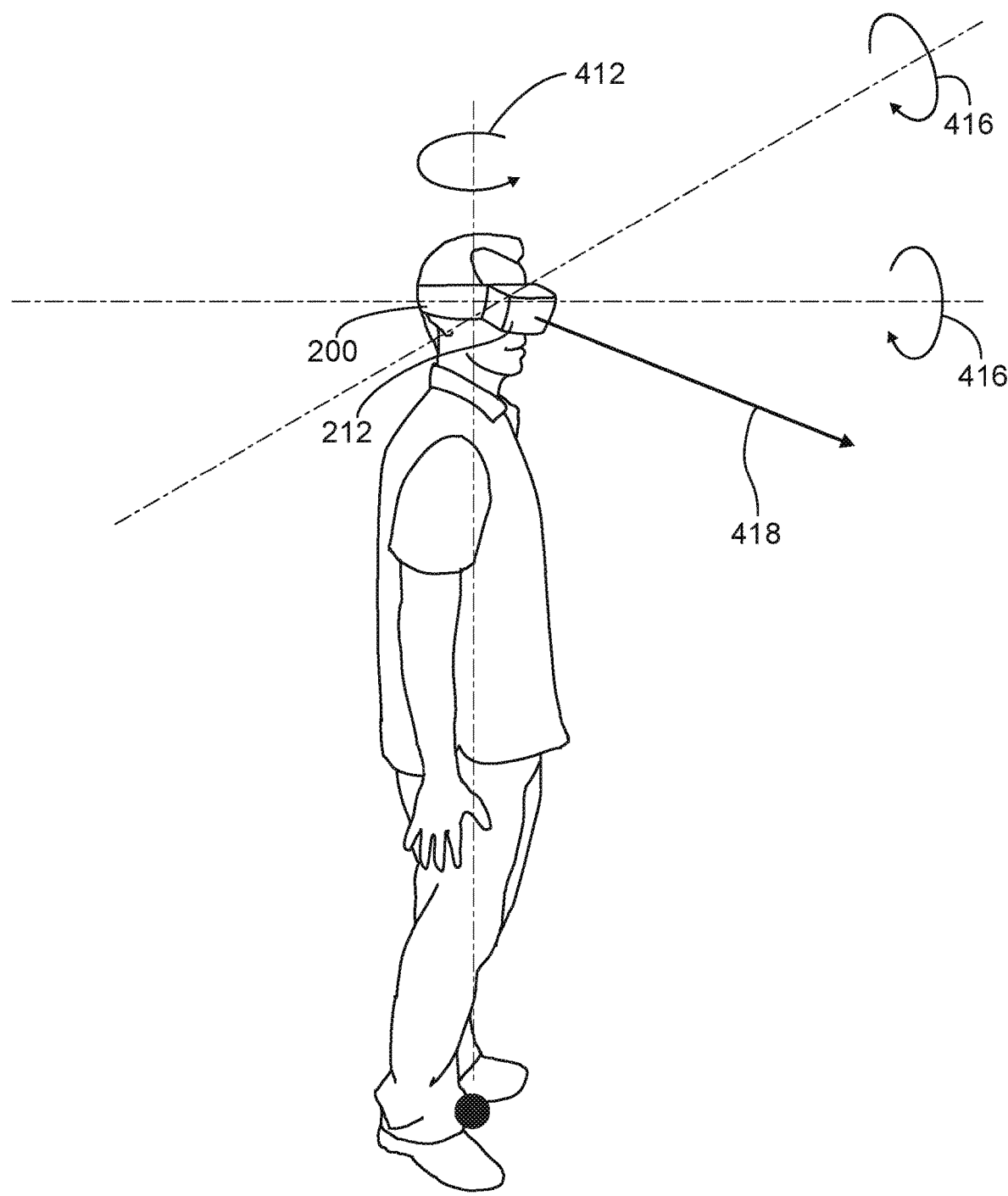

Further, mobile device 200 can determine the orientation of mobile device 200 (i.e., the mobile device's own orientation). In some examples (such as glasses), there is a fixed relationship between the orientation of the mobile device 200 and the orientation of the user. Accordingly, the mobile device 200 can determine the orientation of the user of mobile device 200, based on inertial sensor measurements obtained from one or more of inertial sensors 210. The position of mobile device 200 can be represented as one or more latitude, longitude, or altitude values. As illustrated in FIG. 4B, the orientation of mobile device 200 can be represented by a value of a roll (e.g., an angle about a longitudinal axis 414), a value of a pitch (e.g., an angle about a transverse axis 416), and a value of a yaw (e.g., an angle about vertical axis 412). The orientation of mobile device 200 establishes a vector 418 that specifies a direction in which the user of mobile device 200 faces while accessing the augmented reality environment. In other instances (not illustrated in FIG. 4B), mobile device 200 or XR computing system 130 can determine the orientation of the user based on an orientation of at least a portion of the user's body (e.g., the user's head or eyes) with respect to the augmented reality environment or a portion of mobile device 200, such as a surface of display unit 208.

Mobile device 200 can also receive, through communications interface 202, data characterizing a corresponding position (e.g., latitude, longitude, or altitude values) and a corresponding orientation (e.g., values of roll, pitch, and yaw, etc.) from mobile device 102, mobile device 104, or the other mobile devices (not shown) across communications network 120. Mobile device 102 can further receive all, or a portion, of the data characterizing the position and orientation of mobile device 102, mobile device 104, or the other mobile devices from XR computing system 130 (e.g., as maintained within position and orientation data 186). Mobile device 200 can store portions of the data characterizing the positions and orientations of mobile device 200, mobile devices 102 or 104, and other mobile devices within a corresponding portion of database 214 (e.g., within position and orientation data 226), along with additional data that uniquely identifies corresponding ones of mobile device 200, mobile devices 102 or 104, and other mobile devices (e.g., MAC addresses, internet protocol (IP) addresses, etc.). In other instances, XR computing system 130 can receive data characterizing the positions or orientations of mobile device 200, mobile devices 102 or 104, and other mobile devices, and can store the received data within a corresponding portion of database 134 (e.g., within position and orientation data 186).

Mobile device 200 or XR computing system 130 can also identify a portion of the augmented reality environment that is visible to the user of mobile device 200 (e.g., in block 308), and obtain depth map data that characterizes the visible portion of the augmented reality environment (e.g., in block 310). Depth mapping module 166, when executed by processors 138 or 218, can receive images representative of that portion of the augmented reality environment visible to the user of mobile device 200, such as stereoscopic images 404 and 406 of FIG. 4A, and can perform any of the example processes described herein to generate a depth map for the visible portion of the augmented reality environment. Mobile device 200 can further provide image data characterizing the visible portion of the augmented reality environment (e.g., stereoscopic images 404 and 406) to XR computing system 130. XR computing system 130 can then execute depth mapping module 166 to generate a depth map for the visible portion of the augmented reality environment, and can perform operations that store the generated depth map data within a portion of database 134 (e.g., depth map data 182). In additional instances, XR computing system 130 can transmit the generated depth map across communications network 120 to mobile device 102. Mobile device 200 can perform operations that store the generated depth map data, or alternatively, the received depth map data, within a portion of database 214, such as depth map data 222.

As described above, the generated or received depth map can associate computed depth values with corresponding positions within the visible portion of the augmented reality environment. The technique can locate a common point in each of the stereoscopic images 404 and 406, determine an offset (number of pixels) between the respective positions of the point in each respective image 404 and 406, and set the depth value of that point in the depth map equal to the determined difference. Alternatively, depth mapping module 166 can establish a value proportional to that pixel offset as the depth value characterizing the particular position within the depth map.

Referring back to FIG. 3, mobile device 200 or XR computing system 130 can identify one or more objects disposed within the visible portion of the augmented reality environment (e.g., in block 312). Semantic analysis module 168, when executed by processor 138 or 218, may access the images (e.g., stereoscopic images 404 and 406) representative of the visible portion of the augmented reality environment. Semantic analysis module 168 can also apply one or more of the semantic analysis techniques described above to the accessed images, to identify physical objects within the accessed images, identify locations, types and dimensions of the identified objects within the accessed images, and thus, identify the locations and dimensions of the identified physical objects within the visible portion of the augmented reality environment.

Figure 5:
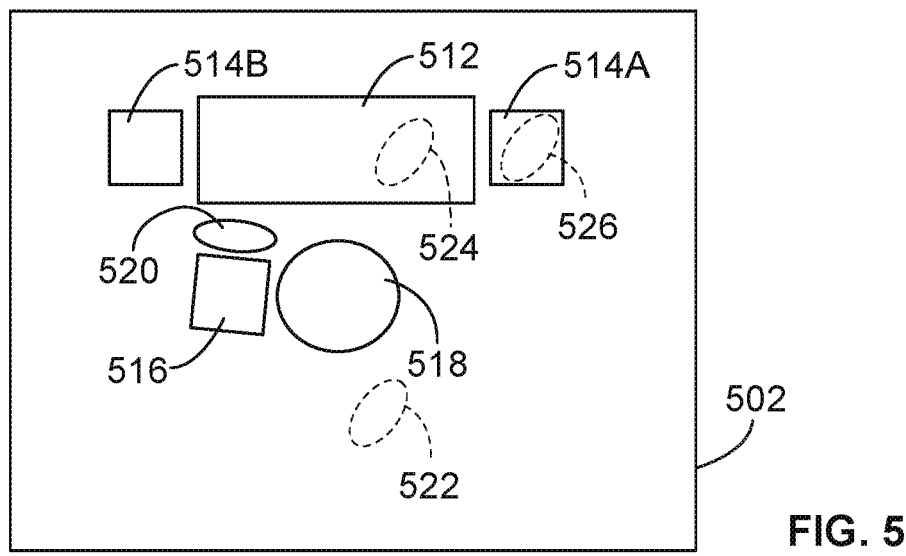
FIG. 5 illustrates an example outcome of a semantic scene analysis by the mobile device of FIG. 2, in accordance with some examples.

Semantic analysis module 168 can apply one or more of the semantic analysis techniques described above to stereoscopic images 404 and 406, which correspond to that portion of the augmented reality environment visible to the user of mobile device 200 through display unit 208, e.g., the HMD. FIG. 5 illustrates a plan view of the visible portion of the augmented reality environment (e.g., as derived from stereoscopic images 404 and 406 and the generated depth map data). As illustrated in FIG. 5, the applied semantic analysis techniques can identify, within the visible portion of the augmented reality environment, several pieces of furniture, such as sofa 512, end tables 514A and 514B, chair 516, and table 518, along with an additional user 520 (e.g., the user operating mobile device 102 or mobile device 104) disposed between sofa 512 and chair 516. Mobile device 200 or XR computing system 130 can perform operations that store semantic data characterizing the identified physical objects (e.g., an object type, such as furniture), along with the locations and dimensions of the identified objects within the visible portion of the augmented reality environment, within respective portions of database 214 or 134, e.g., within respective ones of object data 224 or 184. FIG. 5 also shows (in phantom) a plurality of candidate positions 522, 524, and 526 for the virtual assistant, described below.

In some examples, XR computing system 130 can generate all or a portion of the data characterizing the physical objects identified within the visible portion of the augmented reality environment, and the locations and dimensions of the identified objects. Mobile device 200 can provide image data characterizing the visible portion of the augmented reality environment (e.g., stereoscopic images 404 and 406) to XR computing system 130, which can access stored depth map data 182 and execute semantic analysis module 168 to identify the physical objects, and their positions and dimensions, within the visible portion of the augmented reality environment. XR computing system 130 can store data characterizing the identified physical objects, and their corresponding positions and dimensions, within object data 184. Additionally, XR computing system 130 can also transmit portions of the stored object data across communications network 120 to mobile device 200, e.g., for storage within object data 224, as described above.

Based on the generated depth map data 222, and on the identified physical objects (and their positions and dimensions), position determination module 170, when executed by processor 138 or processor 218, can establish a plurality of candidate positions for the item of virtual content (e.g., candidate positions 522, 524, and 526 of the virtual assistant in FIG. 5) within the visible portion of the augmented reality environment (e.g., in block 314). Position determination module 170 can also compute placement scores that characterize a viability of each of the candidate positions 522, 524, and 526 of the virtual assistant within the augmented reality environment (e.g., in block 316).

Figure 6A:
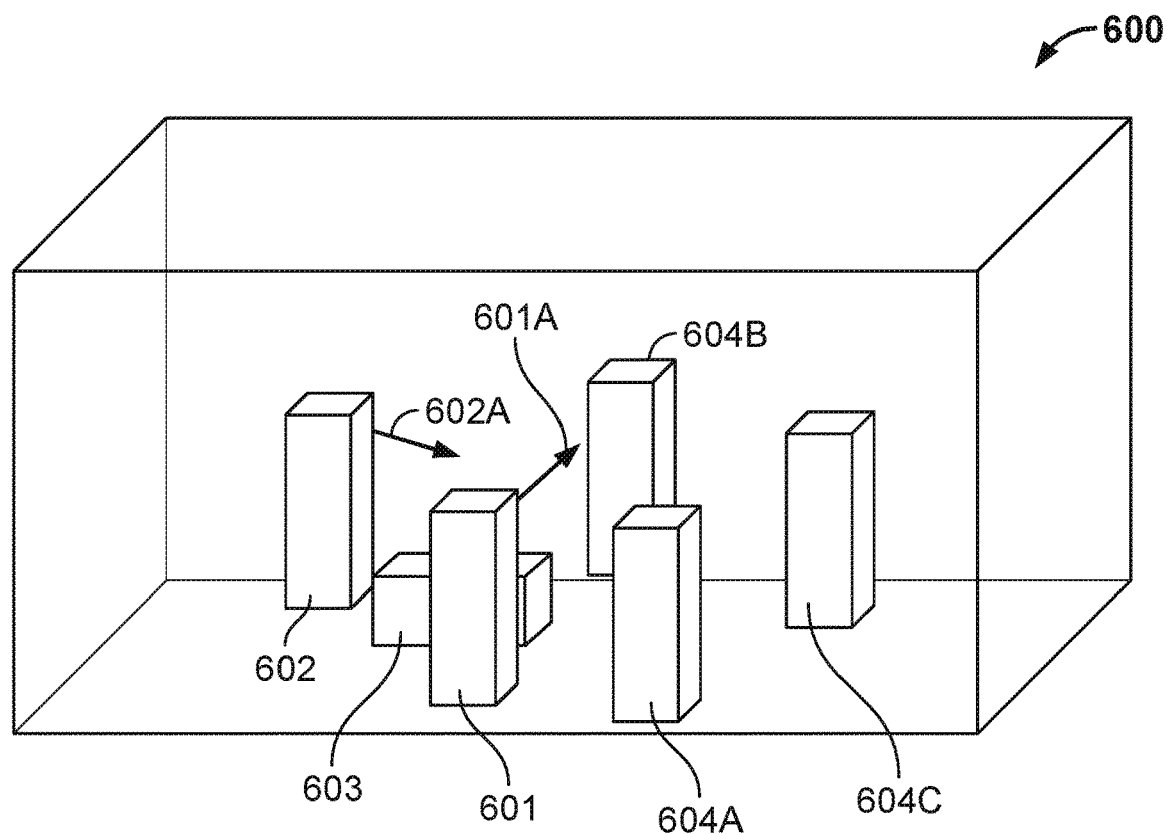
FIGS. 6A-6D, 7A, 7B, and 8 are diagrams illustrating aspects of a process for computing placement scores for candidate positions of virtual assistants within the augmented reality environment using the network of FIG. 1, in accordance with some examples.

As illustrated schematically in FIG. 6A, a visible portion 600 of the augmented reality environment may include a user 601, which corresponds to the user of mobile device 200, and a user 602, which corresponds to the user of mobile devices 102 or 104. Users 601 and 602 may be disposed within visible portion 600 at corresponding positions, and may be oriented to face in directions specified by respective ones of vectors 601A and 602A. Additionally, an object 603, such as sofa 512 or chair 516 of FIG. 5, may be disposed between users 601 and 602 within the augmented reality environment. Further, position determination module 170 can establish candidate positions for the virtual assistant within visible portion 600, as represented by candidate virtual assistants 604A, 604B, and 604C in FIG. 6A. Although the candidate virtual assistants 604A, 604B, and 604C are depicted as rectangular parallelepipeds in FIG. 6A, graphics module 176 can generate the virtual assistant in any shape, or use any avatar to depict the virtual assistant.

Position determination module 170 can compute a placement score, e.g., $\text{cost}(p_{asst})$, for each of the candidate positions, e.g., $p_{asst}$, of the virtual assistant within the visible portion of the augmented reality environment in accordance with the following formula:

$$\text{cost}(p_{asst}) = c_{cons} + c_{supp} + \sum_{Users} c_{angle} + c_{dis} + c_{vis}$$

By way of example, and for a corresponding one of the candidate positions, a value of $c_{cons}$ reflects a presence of a physical constraint imposed by the augmented reality environment (e.g., a hazard, such as a lake or cliff) at the corresponding candidate position. Similarly, a value of $c_{supp}$ characterizes an ability of a physical object disposed at the corresponding candidate location to support the virtual assistant. If the corresponding candidate position were disposed within a lake or other natural hazard, position determination module 170 can assign a value of infinity to $c_{cons}$ (i.e., $c_{cons}=\infty$) or any value much larger than any expected score without a dangerous condition, to indicate that virtual assistant cannot be disposed at the corresponding candidate position.

Similarly, if the corresponding candidate position is coincident with a table or other physical object incapable of supporting the virtual assistant (e.g., candidate position 526 on end table 514A, or positions on end table 514B or chair 516 of FIG. 5), position determination module 170 can assign a value of infinity to $c_{supp}$ (i.e., $c_{supp}=\infty$). Alternatively, if the corresponding candidate position is coincident with a physical object capable of supporting the virtual assistant (e.g., candidate position 524 on sofa 512 or a position on chair 516 of FIG. 5), position determination module 170 can assign a value of zero to $c_{supp}$ (i.e., $c_{supp}=0$), which indicates that virtual assistant can be disposed at the corresponding candidate position and supported by the coincident object. The values of $c_{cons}$ and $c_{supp}$ assigned to each candidate position by position determination module 170 may ensure the eventual position of the virtual assistant with the visible portion of the augmented reality environment corresponds to the real-world constraints imposed on each user within the augmented reality environment.

Figure 6B:
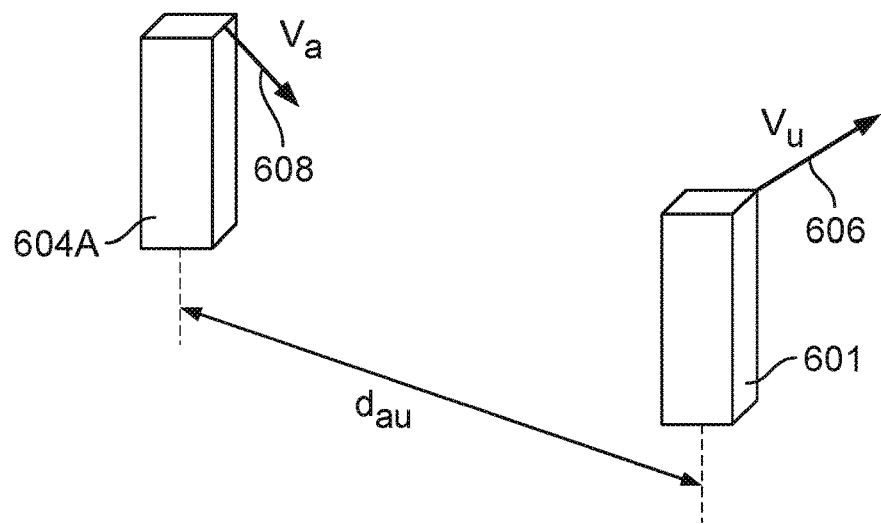
Figure 6C:
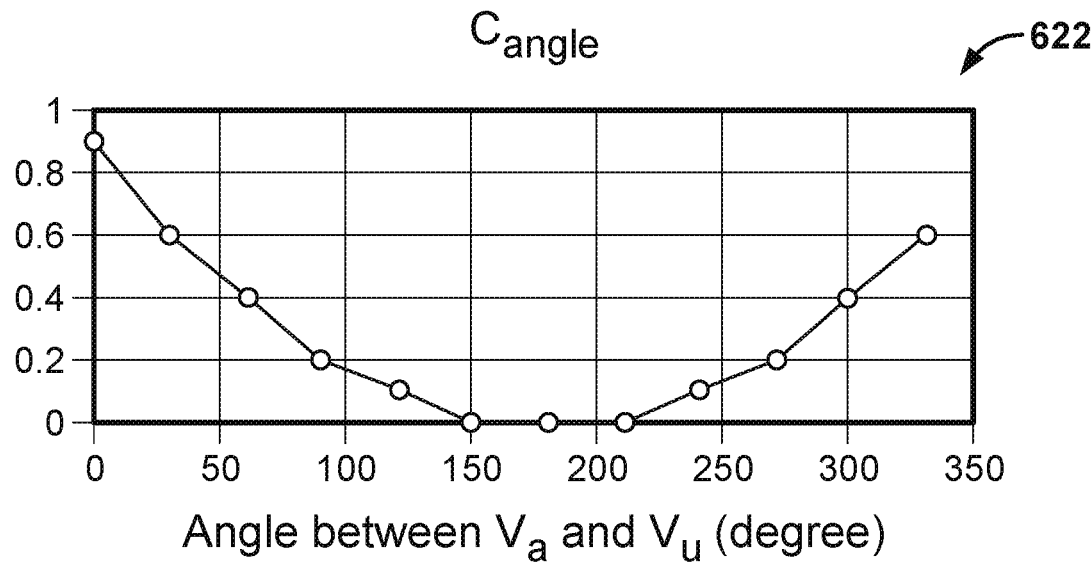
Figure 6D:
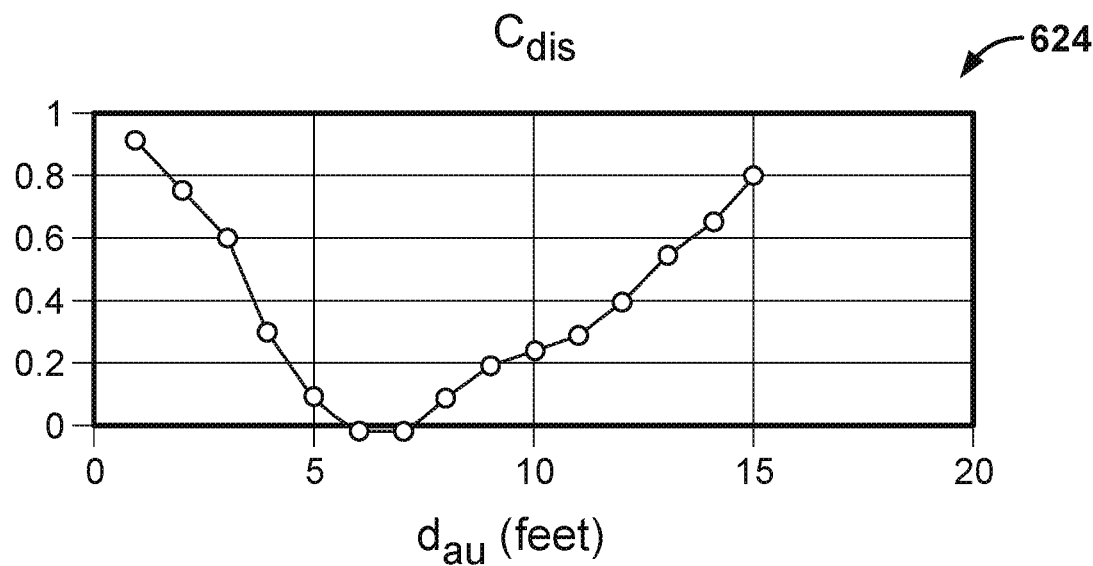

Referring to FIG. 6B-6D, $c_{angle}$, $c_{dis}$, and $c_{vis}$ represent user-specific values for each user 601 and for a candidate virtual assistant 604A at each respective candidate position. FIG. 6B shows the spatial relationship between a user 601 and a candidate virtual assistant 604A. The user 601 and the candidate virtual assistant 604A are separated by a distance $d_{au}$. In FIG. 6C, $c_{angle}$ characterizes a viewing angle of the virtual assistant at the candidate position relative to the user at the determined position as a function of the angle between $V_a$ and $V_u$. In FIG. 6D, $c_{dis}$ characterizes a displacement between the candidate position of candidate virtual assistant 604A and determined position of the user 601. Based on the relationships shown in FIGS. 6B-6D, position determination module 170 determines $c_{vis}$, a value indicative of visibility of a face of the user 601 to the candidate virtual assistant 604A disposed at the candidate position.

For each candidate position, position determination module 170 can establish a corresponding orientation for the virtual assistant (e.g., based on corresponding established values of roll, pitch, and yaw), as shown in FIG. 6B. Based on the established orientation for the virtual assistant, position determination module 170 can compute a vector, e.g., $v_a$, indicative of a direction in which the candidate virtual assistant 604A faces if the virtual assistant is located at the candidate position. Similarly, for each user 601 disposed within the visible portion of the augmented reality environment, position determination module 170 can access orientation data for the user 601 (e.g., data specifying values of roll, pitch, and yaw from position and orientation data 226), and compute a vector, e.g., $v_u$, indicative of a direction in which the user 601 faces at the corresponding position of the user 601.

For each pair of candidate and user positions, position determination module 170 can compute a value of the angle between $v_a$ and $v_u$, as measured in degrees (e.g., a viewing angle). By way of example, and in reference to FIG. 6B, user 601 may be facing in a direction shown by direction vector 606, as specified by direction vector $v_u$, and candidate virtual assistant 604A may be facing in a direction shown by direction vector 608, as specified by vector $v_a$. Position determination module 170 can compute a difference, in degrees, between direction vectors 608 and 606, and can determine the corresponding value of $c_{angle}$ for user 601 and the candidate position associated with candidate virtual assistant 604A based on a predetermined, empirical relationship 622 shown in FIG. 6C.

As illustrated in FIG. 6C, the value of $c_{angle}$ is at a minimum for differences in $v_a$ and $v_u$ ranging from approximately 150° to approximately 210° (e.g., when user 601 and candidate virtual assistant 604A face approximately toward each other). Additionally, the value of $c_{angle}$ is at a maximum for differences in $v_a$ and $v_u$ approach 0° or 360° (e.g., when user 601 and candidate virtual assistant 604A face in the same direction or away from each other). The exemplary processes that compute $c_{angle}$ for user 601 and candidate virtual assistant 604A (e.g., as disposed at the corresponding candidate position) may be repeated for each combination of user and established candidate position within the visible portions of the augmented reality environment.

Further, for each pair of the established candidate positions and user positions within the visible portion of the augmented reality environment, position determination module 170 can compute a displacement $d_{au}$ between corresponding ones of the established candidate positions and the user position. As illustrated in FIG. 6B, position determination module 170 can compute a displacement 614 between user 601 and candidate virtual assistant 604A in the augmented reality environment. Position determination module 170 can also determine the corresponding value of $c_{dis}$ for user 601 and the candidate position associated with candidate virtual assistant 604A based on a predetermined, empirical relationship 624 shown in FIG. 6D. As illustrated in FIG. 6D, the value of $c_{dis}$ is at a minimum for displacements of approximately five to six feet, and is at a maximum for displacements approaching zero or approaching, and exceeding, fifteen feet.

In other instances, position determination module 170 can adjust (or establish) the value of $c_{dis}$ for user 601 and candidate virtual assistant 604A to reflect a displacement between candidate virtual assistant 604A (e.g., disposed at the candidate position) and one or more objects disposed within the augmented reality environment, such as object 603 of FIG. 6A. For example, user 601 may interact within object 603 within the augmented reality environment, and position determination module 170 can access data identifying the position of object 603 within that augmented reality environment (e.g., object data 224 of database 214). Position determination module 170 and can compute the displacement between candidate virtual assistant 604A and the position of object 603, and can adjust (or establish) the value of $c_{dis}$ for user 601 and candidate virtual assistant 604A to reflect the interaction between user 601 and the one or more objects. The example processes that compute $c_{dis}$ for user 601 and candidate virtual assistant 604A (e.g., as disposed at the corresponding candidate position) can be repeated for each combination of user and candidate position within the visible portions of the augmented reality environment.

Figure 7A:
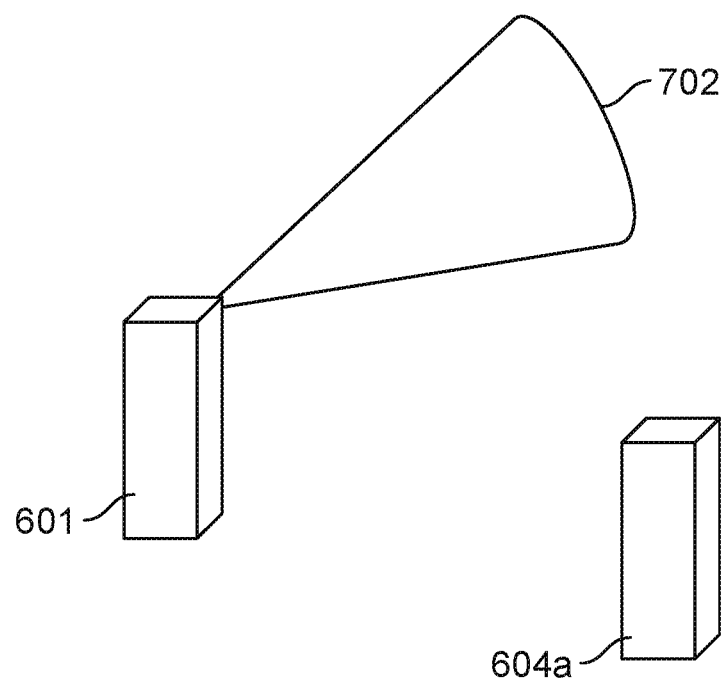

Additionally, and for each pair of the established candidate positions and user positions within the visible portion of augmented reality environment, position determination module 170 can compute a field-of-view of the user based on the user's orientation (e.g., the values of roll, pitch, and yaw). Position determination module 170 can also establish a value of $c_{vis}$ corresponding to a determination that the virtual assistant, when disposed at the corresponding established candidate position, would or would not be visible to the user. As illustrated in FIG. 7A, position determination module 170 can compute a field-of-view 702 for the user, and can determine that candidate virtual assistant 604A is not present within field-of-view 702, and is thus not visible to the user, when disposed at the corresponding established candidate position. In view of the determined lack of visibility, position determination module 170 can assign a value of 100 to $c_{vis}$ for user 601 and the candidate position associated with candidate virtual assistant 604A.

Figure 7B:
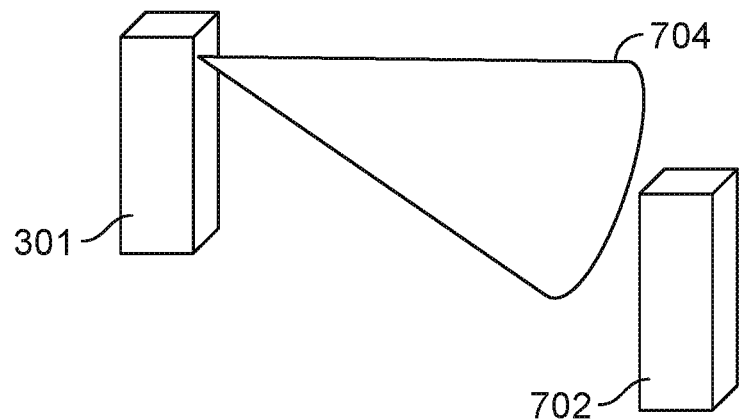

Illustrated in FIG. 7B, position determination module 170 can compute an additional field-of-view 704 for the user based on the user's current orientation. Further, position determination module 170 can determine that candidate virtual assistant 604A is present within additional field-of-view 704 and is visible to the user. In view of the determined visibility, position determination module 170 can assign a value of zero to $c_{vis}$ for user 601 and the candidate position associated with candidate virtual assistant 604A. Additionally, as described above, the exemplary processes that compute $c_{vis}$ for user 601 and candidate virtual assistant 604A (e.g., as disposed at the corresponding candidate position) can be repeated for each combination of user and candidate position within the visible portions of the augmented reality environment.

Further, the exemplary processes are not limited to any particular value of $c_{cons}$, $c_{supp}$, or $c_{vis}$, or to any particular empirical relationship specifying values of $c_{angle}$ and $c_{dis}$. The exemplary processes described herein can assign any additional or alternate value to $c_{cons}$, $c_{supp}$, or $c_{vis}$, or can establish values of $C_{angle}$ and $c_{dis}$ in accordance with any additional or alternative empirical relationship, that would be appropriate to the augmented virtual environment. Further, although described as a cone in FIGS. 7A and 7B, the field-of-view of the user can be characterized by any appropriate shape for the augmented reality environment and display unit 208.

In the examples described above, mobile device 200 or XR computing system 130 executes position determination module 170 to compute a placement score $p_{ast}$ for each of the candidate positions of the virtual assistant in block 316. The computed placement scores may reflect structural and physical constraints imposed on the candidate positions by the augmented reality environment and, further, may reflect the visibility and proximity of the virtual assistant to each user within the augmented reality environment when the virtual assistant is placed at each of the candidate positions. In other instances, described below, the computed placement scores can also reflect a level of interaction between each of the users in the augmented reality environment.

Figure 8:
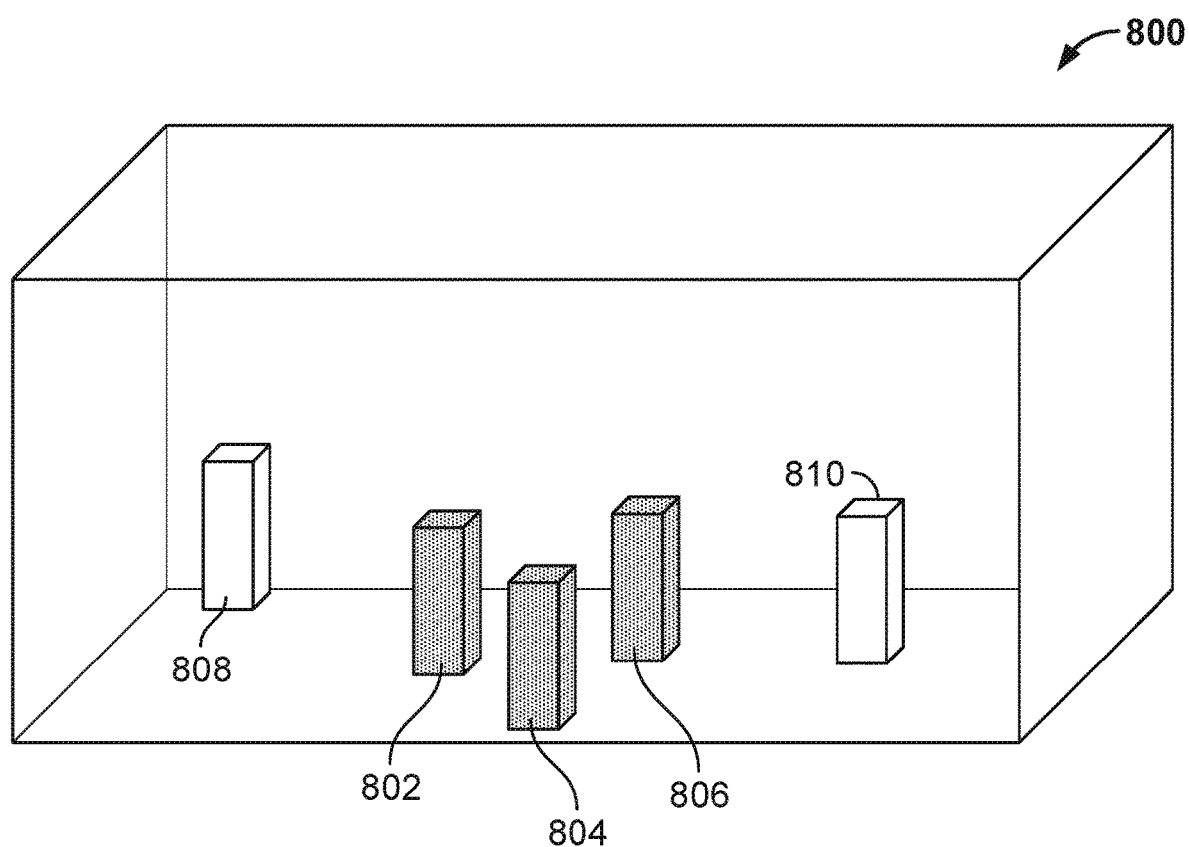

For example, as illustrated in FIG. 8, a visible portion 800 of the augmented reality environment may include users 802, 804, 806, 808, and 810, each of whom may be disposed at corresponding positions within visible portion 800. A group of the users, such as users 802, 804, and 806, may be positioned together within visible portion 800 and may closely interact and converse while accessing the augmented reality environment. Further, current and historical orientations of each of users 802, 804, and 806 (e.g., as maintained within position and orientation data 226) may indicate that users 802, 804, and 806 are disposed toward and face each other, or alternatively, that users 804 and 806 are disposed toward and face user 802 (e.g., a "leader" of the group).

Other users, such as users 808 and 810, may be disposed away from the user 802, 804, and 806. While the other users 808 and 810 may monitor conversations between users 802, 804, and 806, the other users 808 and 810 may not participate in the monitored conversations and may experience limited interactions with each other and with users 802, 804, and 806. Further, current and historical orientations of each of the users 808 and 810 may indicate that users 808 and 810 face away from each other and from users 802, 804, and 806.

In block 316, position determination module 170 can assign weights to the user-specific contributions to the placement score, e.g., $\text{cost}(p_{asst})$, for each of the candidate positions of the virtual assistant or other item of virtual content, e.g., $p_{asst}$, in accordance with user-specific variations in a level of interaction within the augmented reality environment. Position determination module 170 can compute a "modified" placement score for each of the candidate positions based on the following formula:

$$\text{cost}(p_{asst}) = c_{cons} + c_{supp} + \sum_{Users} s_{inter}(c_{angle} + c_{dis} + c_{vis})$$

To account for variations in the interaction level between each of the users, position determination module 170 can apply an interaction weighting factor $s_{inter}$ to each user-specific combination of $c_{angle}$, $c_{dis}$, and $c_{vis}$. Position determination module 170 can determine a value of $s_{inter}$ for each of the users within the visible portion of the augmented reality environment based on an analysis of stored audio data that captured the interaction between the users (e.g., as stored within interaction data 228) and based on a current and historical orientation of each user. For example, position determination module 170 can assign a large value of $s_{inter}$ to users that closely interact within the visible portion of the augmented reality environment, and a small value of $s_{inter}$ to users experiencing limited interaction. Additionally, based on an analysis of stored audio and orientation data, position determination module 170 can identify a group leader among the interacting users, and assign a value of $s_{inter}$ to the group leader that exceeds values of $s_{inter}$ assigned to other interacting users.

By weighting the user-specific contribution to the placement score for a candidate position based on user-specific interaction levels, the disclosed implementations may bias the disposition of the virtual assistant towards positions in the augmented reality environment that are associated with significant levels of user interaction. For example, by assigning a large value of $s_{inter}$ to interacting users 802, 804, and 806 of FIG. 8, position determination module 170 can increase a likelihood that an established position of the virtual assistant will be proximate to users 802, 804, and 806 within the visible portions of the augmented reality environment. The disposition of the virtual assistant at positions proximate to highly interactive users may enhance the ability of the highly interactive users to interact with the virtual assistant without modification to corresponding poses or orientations. The exemplary dispositions, and corresponding assigned value of $s_{inter}$, may bias any large changes in posture or orientation to users experiencing limited interaction, which may prompt the less interactive users to further interact with the augmented reality environment.

Referring back to FIG. 3, position determination module 170, when executed by mobile device 200 of XR computing system 130, can establish one of the candidate positions as a placement position of the item of virtual content within the visible portion of the augmented reality environment (e.g., in block 318). Position determination module 170 can identify a minimum of the computed placement scores for the candidate positions (e.g., $\text{cost}(p_{asst})$) and identify the corresponding candidate position associated with the minimum of the computed placement scores. In some examples, position determination module 170 can establish the corresponding candidate position as the placement position of the virtual assistant or other item of virtual content, $p^*_{asst}$, as described below:

$$p^*_{asst} = \mathrm{argmin}_{p_{asst}}\{\mathrm{cost}(p_{asst})\}$$

For example, in block 318, position determination module 170 can determine that the placement cost computed for the candidate position associated with candidate virtual assistant 604A (e.g., as illustrated in FIG. 6A) represents a minimum of the placement scores, and can establish that candidate position as the placement position for the virtual assistant or other item of virtual content.

In other instances, position determination module 170 may be incapable of identifying a placement position for the virtual assistant that is consistent with both the physical constraints imposed by the augmented reality environment and the positions, orientations, and levels of interaction of the users disposed within the augmented reality environment. For example, a portion of the augmented reality environment visible to user 601 (e.g., whose gestural or spoken input invoked the virtual assistant) may include an ocean surrounded by cliffs. Position determination module 170 may perform any of the operations described herein to determine that each candidate position of the virtual assistant represents a hazard (e.g., associated with an infinite value of $c_{cons}$), and thus, position determination module 170 is constrained from placing the virtual assistant within the visible portion of the augmented reality environment.

Based on this determination, position determination module 170 can access stored data identifying portions of the augmented reality environment previously visible to user 601 (e.g., as maintained by storage media 132 of XR computing system 130 or storage media 211 of mobile device 200). In other instances, position determination module 170 can also determine a portion of the augmented reality environment disposed adjacent to user 601 within the augmented reality environment (e.g., to the left, right, or behind user 601). Position determination module 170 can then perform any of the operations described herein to determine an appropriate placement position for the virtual assistant within the previously visible portion of the augmented reality environment, or alternatively, within the adjacently disposed portion of the augmented reality environment.

Further, in some instances, position determination module 170 may determine that no previously visible or adjacently disposed portion of the augmented reality environment is suitable for the placement of the virtual assistant. In response to this determination, position determination module 170 can generate an error signal that causes mobile device 200 or XR computing system 130 to maintain the invisibility of the virtual assistant within the augmented reality environment, e.g., during a specified future time period or until detection of an additional gestural or spoken input by user 601.

Referring back to FIG. 3, mobile device 200 or XR computing system 130 can perform operations that insert the item of virtual content, e.g., the virtual assistant, at the determined placement position within the visible portion of the augmented reality environment (e.g., in block 320). In some examples, virtual content generation module 172, when executed by processor 138, can perform any of the processes described herein to generate the item of digital content, such as an animated representation of the virtual assistant, and can transmit the generated item of virtual content and the determined placement position across network 120 to mobile device 200, which can perform operations that display the animated representation at the determined placement position within the augmented reality environment, e.g., through display unit 208, along with corresponding audio content. In other examples, virtual content generation module 172, when executed by processor 218, can perform any of the processes described herein to generate locally the item of digital content, such as the animated representation of the virtual assistant, and display that the animated representation at the determined placement position within the augmented reality environment, e.g., through display unit 208, along with the corresponding audio content.

Virtual content generation module 172 provides a means for inserting the virtual assistant into the augmented reality environment at the determined placement position. For example, a graphics module 176 of virtual content generation module 172 can generate the animated representation based on stored data, e.g., graphics data 190 or local graphics data 230, that specifies certain visual characteristics of the virtual assistant, such as visual characteristics of a user-selected avatar. Further, a speech synthesis module 178 of virtual content generation module 172 can generate audio content representative of portions of an interactive dialogue spoken by the generated virtual assistant based on stored data, e.g., speech data 192 or local speech data 232. The concurrent presentation of the animated representation and the audio content may establish the virtual assistant within the visible portion of the augmented reality environment and facilitate and interaction between the user of mobile device 200 and the virtual assistant.

Mobile device 200 or XR computing system 130 can perform operations that determine whether a change in a device state, such as a change in the position or orientation of mobile device 200, triggers a repositioning of the virtual assistant within the visible portion of the augmented reality environment (e.g., in block 322). A change in the device state may trigger the repositioning of the virtual assistant or modify objects or users within the visible portion of the augmented reality environment (e.g., to include new objects, etc.). For example, the change in the device state may trigger the repositioning of the virtual assistant when a magnitude of the change exceeds a predetermined threshold amount.

If mobile device 200 or XR computing system 130 determines that the change in the device state triggered the repositioning of the virtual assistant (e.g., in block 322; YES), exemplary process 300 can branch back to block 308. Then the mobile device 200 or XR computing system 130 can identify a portion of the augmented reality environment that is visible to the user of mobile device 200 based on the newly changed device state, and perform any of the processes described herein to move the virtual assistant to a position to the portion of the augmented reality environment that is visible to the user. Alternatively, if mobile device 200 or XR computing system 130 determines that the change in the device state does not trigger repositioning of the virtual assistant (e.g., in block 324; NO), exemplary process 300 can branch to block 324, and process 300 is complete.

As described above, the item of virtual content can include an animated representation of a virtual assistant. In response to the establishment of the virtual assistant within the visible portion of the augmented reality environment, the user of mobile device 200 may interact with the virtual assistant and provide spoken or gestural input to mobile device 102 specifying commands, requests, or queries. In response to the spoken input, mobile device 102 can perform any of the processes described above to parse the spoken query and obtain textual data corresponding to a command, request, or query associated with the spoken input, and to perform operations corresponding to the textual data. In one example, the spoken input corresponds to a spoken command to revoke the virtual assistant (e.g., "remove the virtual assistant"), and operations module 244 can perform any of the processes described above to remove the virtual assistant from the augmented reality environment.

The spoken input may further correspond to a request for additional information identifying certain objects disposed within the augmented reality environment or certain audio or graphical content provided by the virtual assistant. Operations module 244 can obtain the textual data corresponding to the uttered query, and package portions of the textual data into query data, which mobile device 200 can transmit across communications network 120 to XR computing system 130. In one example, XR computing system 130 can receive the query data, and perform any of the processes described above to obtain information responsive to the query data (e.g., based on locally stored data or information received from additional computing systems 160). XR computing system 130 can also verify that the obtained information comports with optionally imposed security or privacy restrictions, and transmit the obtained information back to mobile device 200 as a response to the query data. Mobile device 200 can also perform any of the processes described above to generate graphical content or audio content (including synthesized speech) that represents the obtained information, and to present the generated graphical or audio content through the virtual assistant's interaction with the user.

The subject matter is not limited to spoken input that, when detected by mobile device 200, facilitates an interaction between the user and the virtual assistant within the augmented reality environment. Digital camera 212 of mobile device 200 can capture digital image data that includes a gestural input provided by the user to mobile device 200, e.g., a hand gesture or a pointing motion. For example, the augmented reality environment can enable the user to explore a train shed of a historic urban train station, such as the now-demolished Pennsylvania Station in New York City. The virtual assistant may be disposed on a platform adjacent to one or more cars of a train, and may be providing synthesized studio content outlining the history of the station and the Pennsylvania Railroad. The user of mobile device 200 may, however, have an interest in steam locomotives, and may point toward the steam locomotive on the platform. Digital camera 212 can capture the pointing motion within corresponding image data. The mobile device 200 can identify the gestural input within the image data, or based on data received from various sensor units, such as the IMUs or other sensors, incorporated into or in communication with mobile device 200 (e.g., incorporated into a glove worn by the user). Mobile device 200 can correlate the identified gestural input with a corresponding operation, and perform the corresponding operation in response to the gestural input, as described below with reference to FIG. 9.

Figure 9:
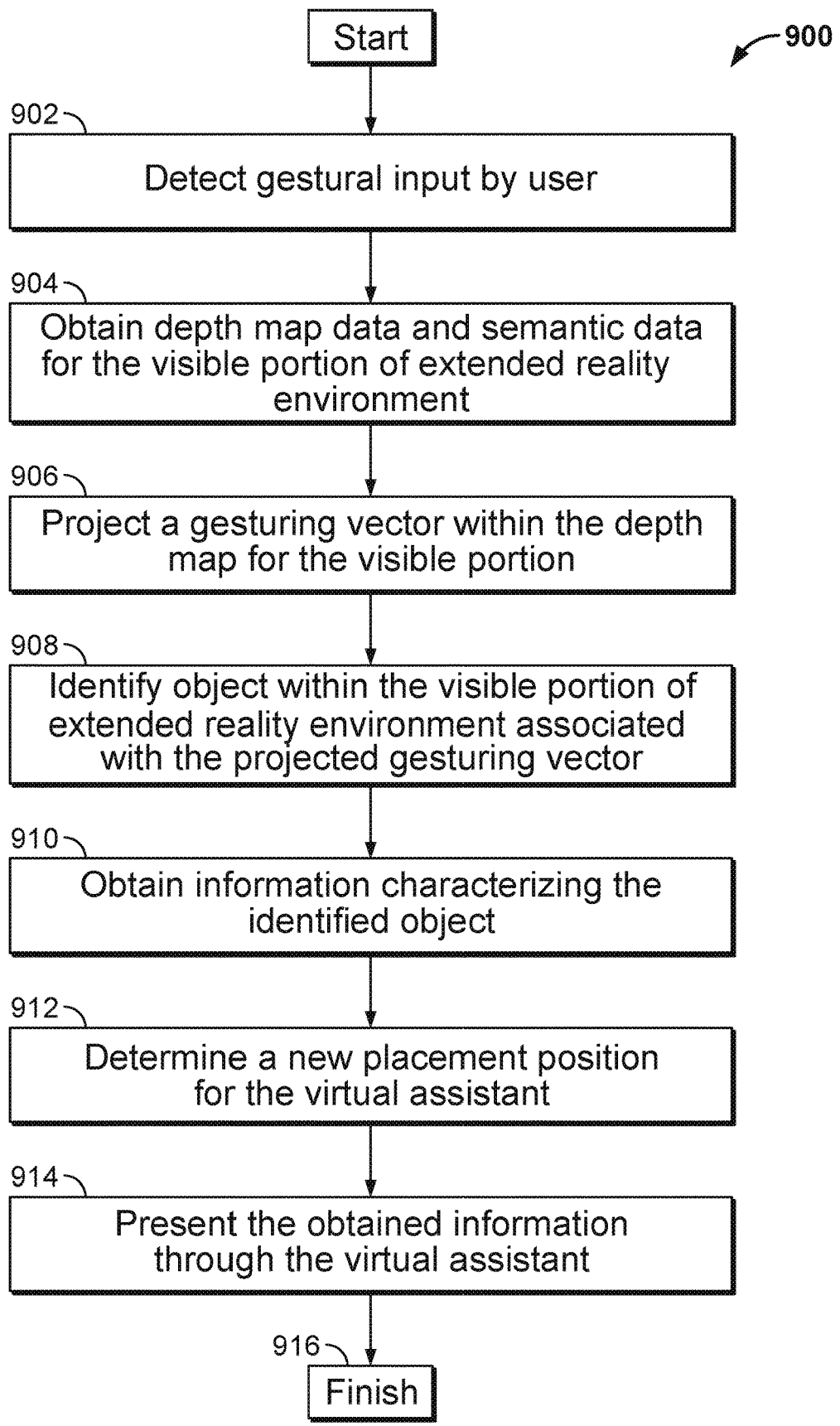
FIG. 9 is a flowchart of an exemplary process for performing operations within an augmented reality environment in response to detected gestural input, in accordance with some examples.

FIG. 9 is a flowchart of exemplary process 900 for performing operations within an extended reality environment in response to detected gestural input, in accordance with some implementations. Process 900 can be performed by one or more processors executing instructions locally at a mobile device, e.g., mobile device 200 of FIG. 2. Some blocks of process 900 can be performed remotely by one or more processors of a server system or other suitable computing platform, such as XR computing system 130 of FIG. 1. Accordingly, the various operations of process 900 can be implemented by executable instructions held in storage media coupled to one or more computing platforms, such as storage media 132 of XR computing system 130 and/or storage media 211 of mobile device 200.

Figure 10A:
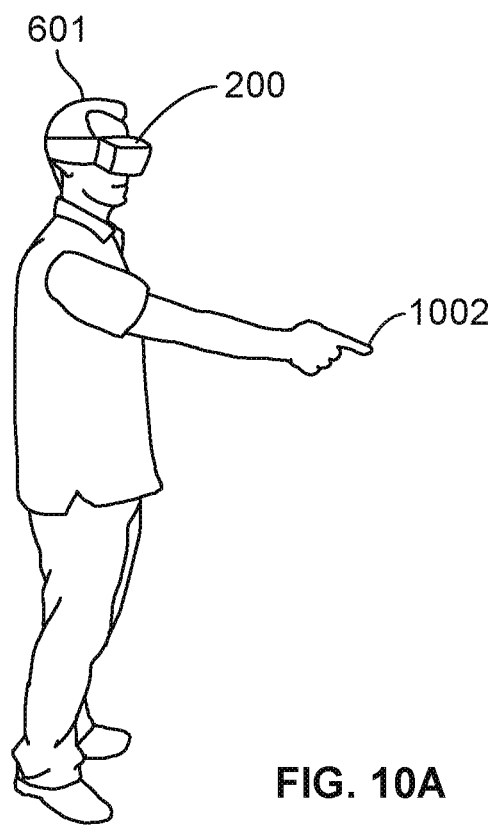
FIGS. 10A and 10B are diagrams illustrating a user interacting with an augmented reality environment using the mobile device of FIG. 2, in accordance with some examples.

Mobile device 200 or XR computing system 130 can perform operations that detect a gestural input provided by the user (e.g., in block 902). As illustrated in FIG. 10A, the user of the mobile device, e.g., user 601, may access the extended reality environment through a corresponding mobile device 200 in the form of a head-mountable display (HMD) unit. User 601 may perform a pointing motion 1002 within the real-world environment in response to content accessed within the extended reality environment. As described above, the extended reality environment may include an augmented reality environment that enables user 601 to explore the train shed of Pennsylvania Station, and user 101 may perform pointing motion 1002 in an attempt to obtain additional information from the virtual assistant 1028 regarding the steam locomotive on the platform.

As described above, digital camera 212 of mobile device 200 can capture digital image data that records the pointing motion 1002. Gesture detection module 240, when executed by processor 218 of mobile device 200, can access the digital image data, and apply one or more of the image processing techniques, computer-visional algorithms, or machine-vision algorithms described above to detect the pointing motion 1002 within one or more frames of the digital image data. Further, operations module 244, when executed by processor 218, can obtain data indicative of the detected pointing motion 1002. Based on portions of gesture library 234, operations module 244 can determine that pointing motion 1002 corresponds to a request to reposition virtual assistant 1028 and obtain additional information characterizing an object associated with pointing motion 1002, e.g., the steam locomotive.

Additionally, mobile device 200 can perform operations that obtain depth map data 222 and object data 224 characterizing a portion of the augmented reality environment visible to the user through display unit 208 (e.g., in block 904). For example, mobile device 200 can obtain the depth map data specifying a depth map for the visible portion of the augmented reality environment from a corresponding portions of database 214, e.g., from depth map data 222. Further, mobile device 200 can obtain data identifying objects disposed within the visible portion of the augmented reality environment, and data identifying the positions or orientations of the identified objects, from object data 224 of database 214.

In other instances, mobile device 200 can transmit, across network 120 to XR computing system 130, data characterizing the request to reposition virtual assistant 1028, such as the data indicative of the detected pointing motion 1002 and the object associated with pointing motion 1002. XR computing system 130 can obtain the depth map data specifying a depth map for the visible portion of the augmented reality environment from a corresponding portion of database 134, e.g., from depth map data 182. XR computing system 130 can also obtain data identifying objects disposed within the visible portion of the augmented reality environment, and data identifying the positions or orientations of the identified objects, from object data 184 of database 134.

Mobile device 200 or XR computing system 130 can also perform operations that establish a gesturing vector 1022 representative of a direction of the detected pointing motion 1002, and project the gesturing vector 1022 onto the depth map established by depth map data 222 or depth map data 182 for the visible portion of the augmented reality environment (e.g., in block 906). For example, position determination module 170, when executed by processor 218 or 138, can establish an origin of the pointing motion 1002, such as the user's shoulder joint or elbow joint, and can generate the gesturing vector 1022 based on a determined alignment of the user's extended arm, hand, and/or finger. Further, position determination module 170 can extend the gesturing vector 1022 from the origin and project the gestural vector into a three-dimensional space established by the depth map for the visible portion of the augmented reality environment.

Mobile device 200 or XR computing system 130 can identify an object within the visible portion of the augmented reality that corresponds to the projection of the gestural vector (e.g., in block 908). Based on object data 224, position determination module 170, when executed by processor 218 of mobile device 200, can determine a position or dimension of one or more objects disposed within the visible portion of the augmented reality. In other instances, position determination module 170, when executed by processor 138 of XR computing system 130, can determine the position or dimension of the one or more objects disposed within the visible portion of the augmented reality environment based on portions of object data 184. Position determination module 170 can then determine that the projected gestural vector intersects the position or the dimension of one of the disposed objects, and can establish that the disposed object corresponds to the projected gestural vector.

Figure 10B:
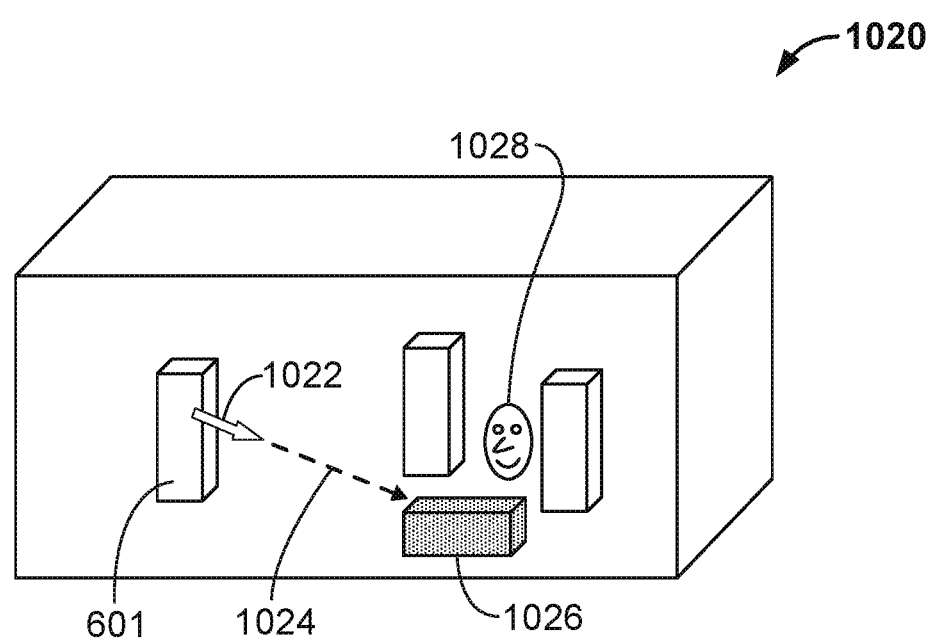

As illustrated in FIG. 10B, position determination module 170 can generate gesturing vector 1022, which corresponds to detected pointing motion 1002, and project that gestural vector (shown generally at 1024) through a three-dimensional space 1020 established by the depth map data 222 for the visible portion of the augmented reality environment. Further, position determination module 170 can also determine that projected gestural vector 1024 intersects an object 1026 disposed within three-dimensional space 1020, and can access portions of object data 224 to obtain information identifying object 1026, such as semantic data that identifies an object type.

Referring back to FIG. 9, mobile device 200 or XR computing system 130 can obtain information that characterizes and describes the identified object within the visible portion of the augmented reality environment (e.g., in block 910). As described above, the identified object may correspond to a particular steam locomotive, and mobile device 200 can perform any of the processes described above to generate query data requesting additional information regarding the particular steam locomotive. Mobile device 200 can transmit the query data to XR computing system 130, and receive a response to the query data that describes the particular steam locomotive and comports with applicable security and privacy restrictions.

Further, using any of the processes described herein, mobile device 200 can generate an animated representation of the virtual assistant 1028, along with graphical or audio content representative of the information describing the identified object. In other instances, XR computing system 130 can generate the animated representation of virtual assistant 1028, along with the graphical or audio content representative of the information describing the identified object using any of the processes described herein, and can transmit the animated representation and the graphical or audio content across network 120 to mobile device 200.

In additional instances, mobile device 200 or XR computing system 130 can perform any of the processes described herein to generate a new placement position for virtual assistant 1028 within the augmented reality environment, such as a position proximate to the identified object (e.g., in block 912). Mobile device 200 can present the animated representation of the virtual assistant 1028 at the new placement position in the augmented reality environment, and present the graphical or audio content to provide an immersive experience that facilitates interaction between the user and the virtual assistant (e.g., in block 914). Exemplary process 900 is then complete in block 916.

In some of the examples described above, the extended reality environment established by mobile device 200, mobile devices 102 or 104, or other devices operating within network environment 100 can correspond to an augmented reality environment that includes virtual tours of various historical areas or landmarks, such as the Giza pyramid complex or Pennsylvania station. The subject matter is not limited to the exemplary environments, and in other instances, mobile device 200 and/or XR computing system 130 can collectively operate to establish a virtual assistant or other items of virtual content within any number of additional or alternate augmented reality environments.

For example, the augmented reality environment may correspond to a virtual meeting location (e.g., a conference room) that includes multiple, geographically dispersed participants. Using any of the processes described herein, mobile device 200 and/or XR computing system 130 can collectively operate to dispose a virtual assistant at a position within the virtual meeting location and facilitate interaction with the participants in support of the meeting.

In some instances, the participants can include a primary speaker or a coordinator of the meeting. When computing the modified placement score for each candidate position within the virtual meeting location, mobile device 200 or XR computing system 130 can apply an additional or alternate weighting factor (e.g., in addition to or as an alternate to sinter, as described above) to the combinations of $c_{angle}$, $c_{dis}$, and $c_{vis}$ associated with the primary speaker or the coordinator of the meeting. Through the application of the additional or alternate weighting factor to each candidate position, mobile device 200 or XR computing system 130 can bias the disposition of the virtual assistant towards positions within the virtual meeting location that are proximate to the primary speaker or the coordinator of the meeting, and further, that enhance interaction between the virtual assistant and the primary speaker or the coordinator of the meeting. For example, the mobile device 200 or XR computing system 130 can perform operations that present the virtual assistant as a "talking head" or similar miniature object disposed in a middle of a "virtual" conference table within the virtual meeting location.

The participants may also provide spoken or gestural input requesting that the virtual assistant present certain graphical content within corresponding presentation regions of the augmented reality environment, such as a virtual whiteboard within the virtual meeting location. The provided input may also request that the virtual assistant perform certain actions, such as starting or stopping a recording of the meeting, or presenting an agenda for the meeting within the augmented reality environment. The virtual assistant can receive requests to provide a reminder regarding the scheduled meetings on the calendars of one or more the participants, to schedule meetings within the calendars, to keep track of time, to take comments, or to disappear for certain periods of time. In some instances, mobile device 200 and/or XR computing system 130 can process the spoken or gestural input to identify the requested graphical content and/or the requested action, and perform operations consistent with the spoken or gestural input.

Additionally, when disposed in extended reality environments, the virtual assistant can also present audio or graphical content that ensures the safety and awareness of one or more users within a real-world environment. For example, the virtual assistant can provide, within the augmented reality environment, warnings regarding real-world hazards (e.g., obstacles, blind-spots, mismatch between real and virtual objects, hot or cold objects, electrical equipment, etc.), or alerts prompting the users to exit the augmented reality environment in response to a real-world emergency.

As described above, extended reality generation and presentation tools, when executed by a mobile device (e.g., mobile device 200) or a computing system (e.g., XR computing system 130) define an augmented reality environment based on certain elements of digital content, such as captured digital video, digital images, digital audio content, or synthetic audio-visual content (e.g., computer generated images and animated content). These tools can deploy the elements of digital content for presentation to a user through display unit 208 incorporated into mobile device 200, such as augmented reality eyewear (e.g., glasses or goggles) having one or more lenses or displays for presenting graphical elements of the deployed digital content. The augmented reality eyewear can, for example, display the graphical elements as augmented reality layers superimposed over real-world objects that are viewable through the lenses, thus enhancing an ability of the user to interact with and explore the augmented reality environment.

Mobile device 200 can also capture gestural or spoken input that requests a placement of an item of virtual content, such as the virtual assistant, within the extended reality environment. For example, and in response to captured gestural or spoken input, mobile device 200 or XR computing system 130 can perform any of the exemplary processes described herein to generate the item of virtual content, identify a placement position for the item of virtual content that conforms to any constraints that may be imposed by the extended reality environment, and insert the generated item of virtual content into the extended reality environment at the placement position. As described above, the item of digital content can include a virtual assistant that, when rendered for presentation within the augmented reality environment, may interact with the user and elicit additional gestural or spoken queries by the user to mobile device 200.

In other examples, one or more of these tools, when executed by mobile device 200 or XR computing system 130, can define a virtual reality environment based on certain elements of the synthetic audio-visual content (e.g., alone or in combination with certain elements of captured digital audio-visual content). The defined virtual reality environment represents an artificial, computer-generated simulation or recreation of a real-world environment or situation, and the tools can deploy the elements of the synthetic or captured audio-visual content through a head-mountable display (HMD) of mobile device 200, such as a virtual reality (VR) headset wearable by the user.

In some instances, the virtual reality environment can correspond to a virtual sporting event (e.g., a tennis match or a golf tournament) that, when presented to the user through the wearable VR headset, provides visual and auditory stimulation that immerses the user in the virtual sporting event and allows the user to perceive a first-hand experience of the virtual sporting event. In other instances, the virtual environment can correspond to a virtual tour that, when presented to the user through the wearable VR headset, enables the user to explore now-vanished historical landmarks or observe historical events of significance, such as military engagements throughout antiquity.

Mobile device 200 can also capture gestural or spoken input that requests a placement of an item of virtual content, such as a virtual assistant, within the virtual reality or augmented virtuality environment. For example, in response to the captured gestural or spoken input—which requests the virtual assistant within the virtual reality or augmented virtuality environment—mobile device 200 or XR computing system 130 can determine a portion of the virtual reality or augmented virtuality environment currently visible to the user through the VR headset. Based on the determined visible portion, mobile device 200 or XR computing system 130 can perform any of the exemplary processes described herein to generate the virtual assistant, identify a placement position for the virtual assistant that conforms to any constraints that may be imposed by the virtual reality or augmented virtuality environment, and insert the generated virtual assistant into the virtual reality or augmented virtuality environment at the placement position.

As described above, the virtual assistant, when rendered for presentation within the augmented reality, virtual reality or augmented virtuality environment, may interact with the user and elicit additional gestural or spoken queries by the user to mobile device 200. For example, the virtual assistant may function within the virtual sporting event as a virtual coach that provides input reflecting the user's observation of, or participation in, the virtual sporting event (and further, that could translate to the user's participation in a real-world sporting event). In other instances, the virtual assistant may function in the virtual tour as virtual tour guide that provides additional information on certain objects or individuals within the virtual reality environment in response to a user query.

Additionally, in some examples, the executed augmented reality, augmented virtuality, and virtual reality tools can also define other virtual environments, and perform operations that generate and position virtual assistants within these defined virtual environments. For instance, these tools, when executed by mobile device 200 or XR computing system 130, can define one or more extended reality environments that combine elements of virtual and augmented reality environments and facilitate varying degrees of human-machine interaction.

By way of example, mobile device 200 or XR computing system 130, can select elements of captured or synthetic audio-visual content for presentation within the extended reality environment based on data received from sensors integrated into or in communication with mobile device 200. Examples of these sensors include, but are not limited to, temperature sensors capable of establishing an ambient environmental temperature or biometric sensors capable of establishing biometric characteristics of the user, such as pulse or body temperature. These tools can then present the elements of the synthetic or captured audio-visual content as augmented reality layers superimposed over real-world objects that are viewable through the lenses, thus enhancing an ability of the user to interact with and explore the extended reality environment in a manner that adaptively reflects the user's environment or physical condition.

The methods and system described herein can be at least partially embodied in the form of computer-implemented processes and apparatus for practicing the disclosed processes. The disclosed methods can also be at least partially embodied in the form of tangible, non-transitory machine readable storage media encoded with computer program code. The media can include, for example, random access memories (RAMs), read-only memories (ROMs), compact disc (CD)-ROMs, digital versatile disc (DVD)-ROMs, "BLUE-RAY DISC"™ (BD)-ROMs, hard disk drives, flash memories, or any other non-transitory machine-readable storage medium. When the computer program code is loaded into and executed by a computer, the computer becomes an apparatus for practicing the method. The methods can also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods can alternatively be at least partially embodied in application specific integrated circuits for performing the methods.

The subject matter has been described in terms of exemplary embodiments. Because they are only examples, the claimed inventions are not limited to these embodiments. Changes and modifications can be made without departing the spirit of the claimed subject matter. It is intended that the claims cover such changes and modifications.

We claim:

1. An apparatus comprising:
a memory; and
a processor coupled to the memory, the processor configured to:
obtain, from a second device, a list of candidate positions for an item of virtual content in an extended reality environment, the list of candidate positions being at least partially based on one or more of a pose of a first device and a pose of the second device;
determine a placement position for the item of virtual content in the extended reality environment based on the list of candidate positions; and
transmit the placement position to one or more of the first device and the second device.

2. The apparatus of claim 1, wherein the apparatus is a server in communication with the first device and the second device.

3. The apparatus of claim 1, wherein the apparatus is the first device, and wherein the placement position is transmitted to the second device.

4. The apparatus of claim 3, wherein the placement position is transmitted to the second device via a server.

5. The apparatus of claim 1, wherein determining the placement position for the item of virtual content in the extended reality environment comprises:
determining a respective placement score for each candidate position in the list of candidate positions based on one or more of the pose of the first device and the pose of the second device; and
wherein determining the placement position for the item of virtual content includes establishing a candidate position from the list of the candidate positions as the placement position based on the respective placement score determined for each candidate position in the list of candidate positions.

6. The apparatus of claim 5, wherein the processor is configured to:
obtain data characterizing an object disposed within the extended reality environment, the obtained data including one or more of a type of the object, a dimension of the object, and a position of the object within the extended reality environment; and
wherein determining the respective placement score for each candidate position in the list of candidate positions is based on one or more of the pose of the first device and the pose of the second device, and based on one or more of the type, the dimension, and the position of the object.

7. The apparatus of claim 5, wherein determining the respective placement score for each candidate position in the list of candidate positions includes:
determining, for a candidate position of the list of candidate positions, a placement score based on one or more displacements between the candidate position and one or more of a position of the first device and a position of the second device within the extended reality environment.

8. The apparatus of claim 5, wherein determining the respective placement score for each candidate position in the list of candidate positions includes:
determining, for a candidate position of the list of candidate positions, a placement score based on one or more viewing angles of one or more of the first device and the second device relative to the item of virtual content.

9. The apparatus of claim 1, wherein the processor is configured to:
receive user input corresponding to a request for information associated with the item of virtual content; and
send a response including the information to one or more of the first device and the second device.

10. The apparatus of claim 1, wherein determining the placement position is further based on user input associated with the item of virtual content.

11. The apparatus of claim 1, wherein the processor is configured to:
receive, from the first device or the second device, user input associated with the item of virtual content; and
cause a modification of the placement position of the item of virtual content within the extended reality environment based on the received user input.

12. The apparatus of claim 1, wherein the processor is configured to:
receive, from the first device or the second device, user input associated with an object in the extended reality environment;
identify the object associated with the received user input; and
cause digital content associated with the identified object to be presented by one or more of the first device and the second device.

13. A computer-implemented method, comprising:
obtaining, by a computing system from a second device, a list of candidate positions for an item of virtual content in an extended reality environment, the list of candidate positions being at least partially based on one or more of a pose of a first device and a pose of the second device;
determining a placement position for the item of virtual content in the extended reality environment based on the list of candidate positions; and
transmitting the placement position to one or more of the first device and the second device.

14. The method of claim 13, wherein the computing system is a server in communication with the first device and the second device.

15. The method of claim 13, wherein the computing system is the first device, and wherein the placement position is transmitted to the second device.

16. The method of claim 15, wherein the placement position is transmitted to the second device via a server.

17. The method of claim 13, wherein determining the placement position for the item of virtual content in the extended reality environment comprises:
  determining a respective placement score for each candidate position in the list of candidate positions based on one or more of the pose of the first device and the pose of the second device; and
  wherein determining the placement position for the item of virtual content includes establishing a candidate position from the list of the candidate positions as the placement position based on the respective placement score determined for each candidate position in the list of candidate positions.

18. The method of claim 17, further comprising:
  obtaining data characterizing an object disposed within the extended reality environment, the obtained data including one or more of a type of the object, a dimension of the object, and a position of the object within the extended reality environment; and
  wherein determining the respective placement score for each candidate position in the list of candidate positions is based on one or more of the pose of the first device and the pose of the second device, and based on one or more of the type, the dimension, and the position of the object.

19. The method of claim 17, wherein determining the respective placement score for each candidate position in the list of candidate positions includes:
  determining, for a candidate position of the list of candidate positions, a placement score based on one or more displacements between the candidate position and one or more of a position of the first device and a position of the second device within the extended reality environment.

20. The method of claim 17, wherein determining the respective placement score for each candidate position in the list of candidate positions includes:
  determining, for a candidate position of the list of candidate positions, a placement score based on one or more viewing angles of one or more of the first device and the second device relative to the item of virtual content.

21. The method of claim 13, further comprising:
  receiving user input corresponding to a request for information associated with the item of virtual content; and
  sending a response including the information to one or more of the first device and the second device.

22. The method of claim 13, wherein determining the placement position is further based on user input associated with the item of virtual content.

23. The method of claim 13, further comprising:
  receiving, from the first device or the second device, user input associated with the item of virtual content; and
  causing a modification of the placement position of the item of virtual content within the extended reality environment based on the received user input.

24. The method of claim 13, further comprising:
  receiving, from the first device or the second device, user input associated with an object in the extended reality environment;
  identifying the object associated with the received user input; and
  causing digital content associated with the identified object to be presented by one or more of the first device and the second device.

25. A non-transitory computer-readable medium having stored thereon instructions that, when executed by one or more processors of a computing system, cause the one or more processor to:
  obtain, from a second device, a list of candidate positions for an item of virtual content in an extended reality environment, the list of candidate positions being at least partially based on one or more of a pose of a first device and a pose of the second device;
  determine a placement position for the item of virtual content in the extended reality environment based on the list of candidate positions; and
  transmit the placement position to one or more of the first device and the second device.

26. The non-transitory computer-readable medium of claim 25, wherein the computing system is a server in communication with the first device and the second device.

27. The non-transitory computer-readable medium of claim 25, wherein the computing system is the first device, and wherein the placement position is transmitted to the second device.

28. The non-transitory computer-readable medium of claim 27, wherein the placement position is transmitted to the second device via a server.

29. The non-transitory computer-readable medium of claim 25, further comprising instructions that, when executed by the one or more processors of a computing system, cause the one or more processor to:
  receive user input corresponding to a request for information associated with the item of virtual content; and
  send a response including the information to one or more of the first device and the second device.

30. The non-transitory computer-readable medium of claim 25, wherein determining the placement position is further based on user input associated with the item of virtual content.

* * * * *